US012761153B2

(12) United States Patent
Angel et al.

(10) Patent No.: US 12,761,153 B2
(45) Date of Patent: Oct. 13, 2026

(54) HYPERSPECTRAL IMAGING WITH A SPATIAL HETERODYNE SPECTROMETER

(71) Applicants: UNIVERSITY OF SOUTH CAROLINA, Columbia, SC (US); LAWRENCE LIVERMORE NATIONAL SECURITY, LLC, Livermore, CA (US)

(72) Inventors: Stanley Michael Angel, Columbia, SC (US); Jerry Chance Carter, Livermore, CA (US)

(73) Assignees: UNIVERSITY OF SOUTH CAROLINA, Columbia, SC (US); LAWRENCE LIVERMORE NATIONAL SECURITY, LLC, Livermore, CA (US)

(*) Notice: Subject to any disclaimer, the term of this patent is extended or adjusted under 35 U.S.C. 154(b) by 88 days.

(21) Appl. No.: 18/778,560

(22) Filed: Jul. 19, 2024

(65) Prior Publication Data

US 2024/0377330 A1 Nov. 14, 2024

Related U.S. Application Data

(62) Division of application No. 17/772,265, filed as application No. PCT/US2020/050502 on Sep. 11, 2020, now Pat. No. 12,072,290.

(Continued)

(51) Int. Cl.
*G01N 21/65* (2006.01)

(52) U.S. Cl.
CPC ..... *G01N 21/65* (2013.01); *G01N 2201/0633* (2013.01); *G01N 2201/0635* (2013.01)

(58) Field of Classification Search
CPC ........... G01N 21/65; G01N 2201/0633; G01N 2201/0635; G01J 3/45
See application file for complete search history.

(56) References Cited

U.S. PATENT DOCUMENTS 5,059,027 A 10/1991 Roesler et al.
5,064,269 A 11/1991 Rogers et al.
(Continued)

OTHER PUBLICATIONS

PCT International Search Report & Opinion Corresponding to PCT/US2020/050502 on Feb. 4, 2021.
(Continued)

*Primary Examiner* — Michelle M Iacoletti
*Assistant Examiner* — Jarreas Underwood
(74) *Attorney, Agent, or Firm* — Dority & Manning, P.A.

(57) ABSTRACT

A hyperspectral imaging apparatus based on a monolithic or free space optical spatial heterodyne spectrometer (SHS) design, array detector, electromagnetic radiation source, and optical collection element is described. The apparatus enables the simultaneous acquisition of spatially isolated Fizeau fringe patterns, each having an encoded light product that is decoded to produce a spectral fingerprint of the interrogated object. Features specific to the SHS, such as a large entrance aperture, large acceptance angle, and no moving parts, enable a variety of optical collection schemes including lens arrays, solid-core and hollow core waveguides, and others. In one example, a microlens array (MLA) is configured with the hyperspectral imaging apparatus to simultaneously image many hundred spatially isolated Fizeau fringe patterns while interrogating an object using an electromagnetic radiation source. Each Fizeau fringe pattern recorded by the array detector is decoded to produce a full Raman or laser-induced breakdown spectroscopy (LIBS) spectrum. Compared to prior art, the hyperspectral imaging apparatus overcomes the primary limita-
(Continued)

tions of needing to trade time resolution for both spectral and spatial data density because the imaging apparatus simultaneously acquires both spectral and special information. Based on the selection and configuration of diffraction gratings, the grating aperture size, Littrow wavelength (i.e., heterodyne wavelength), and optical collection configuration, the apparatus can be tailored to produced low or high spectral resolution with a spectral bandpass that covers a portion or the entire Raman spectral range (up to 4200 $cm^{-1}$) and for LIBS as well.

20 Claims, 21 Drawing Sheets

Related U.S. Application Data

(60) Provisional application No. 62/933,732, filed on Nov. 11, 2019.

(56) References Cited

U.S. PATENT DOCUMENTS

| | | | | |
|---|---|---|---|---|
| 7,372,562 | B2 | 5/2008 | Islam et al. | |
| 7,586,602 | B2 | 9/2009 | Maity et al. | |
| 8,154,732 | B2 | 4/2012 | Bodkin et al. | |
| 9,200,961 | B2 | 12/2015 | Angel et al. | |
| 9,964,396 | B1 | 5/2018 | Scott et al. | |
| 2005/0083521 | A1 | 4/2005 | Kamerman | |
| 2007/0086002 | A1 | 4/2007 | Islam et al. | |
| 2007/0121119 | A1 | 5/2007 | Martinez | |
| 2007/0159634 | A1 | 7/2007 | Englert | |
| 2007/0239992 | A1 | 10/2007 | White et al. | |
| 2008/0002198 | A1 | 1/2008 | Sun et al. | |
| 2008/0018890 | A1 | 1/2008 | Maity et al. | |
| 2008/0025624 | A1 | 1/2008 | Brady | |
| 2008/0080585 | A1 | 4/2008 | Glebov et al. | |
| 2008/0204743 | A1 | 8/2008 | Maity et al. | |
| 2009/0231592 | A1 | 9/2009 | Harlander et al. | |
| 2009/0279085 | A1 | 11/2009 | Ebstein | |
| 2010/0152976 | A1 | 6/2010 | White et al. | |
| 2010/0165335 | A1 | 7/2010 | Tearney | |
| 2011/0222048 | A1 | 9/2011 | Englert et al. | |
| 2012/0050750 | A1 | 3/2012 | Hays et al. | |
| 2013/0135602 | A1* | 5/2013 | Mizumura | G03F 7/70275 355/67 |
| 2013/0188181 | A1* | 7/2013 | Angel | G01J 3/4531 356/301 |
| 2013/0314694 | A1* | 11/2013 | Tchoryk, Jr. | G01S 17/58 356/28.5 |
| 2014/0029004 | A1* | 1/2014 | Bodkin | G01J 3/2823 356/328 |
| 2014/0247447 | A1 | 9/2014 | Angel et al. | |
| 2015/0030503 | A1 | 1/2015 | Angel et al. | |
| 2015/0085289 | A1* | 3/2015 | Kang | G02B 3/0006 356/445 |
| 2015/0241280 | A1* | 8/2015 | Lenzner | G01J 3/1804 356/451 |
| 2018/0128683 | A1 | 5/2018 | Hosseini | |

OTHER PUBLICATIONS

Acosta-Maeda et al., Remote Raman Efficiencies and Cross-Sections of Organic and Inorganic Chemicals, Applied Spectroscopy, vol. 71, Issue 5, 2017, pp. 1025-1038. (Abstract Only) https://doi.org/10.1177/0003702816668531.

Aggarwal et al., Measurement of the Absolute Raman Cross Section of the Optical Phonons in a Type Ia Natural Diamond, Solid State Communications, vol. 152, Issue 3, Feb. 2012, pp. 204-209. (Abstract Only) https://doi.org/10.1016/j.ssc.2011.11.005.

Allen et al., Hyperspectral Raman Imaging Using a Spatial Heterodyne Raman Spectrometer with a Microlens Array, Applied Spectroscopy, vol. 74, Issue 8, Aug. 2020, pp. 921-931. (Abstract Only) L.org/10.1177/0003702820906222.

Allen et al., Miniature Spatial Heterodyne Spectrometer for Remote Laser Induced Breakdown and Raman Spectroscopy using Fresnel Collection Optics, Spectrochimica Acta Part B: Atomic Spectroscopy, vol. 149, Nov. 2018, pp. 91-98. https://www.sciencedirect.com/science/article/abs/pii/S0584854717306043.

Angel et al., Remote-Raman Spectroscopy at Intermediate Ranges Using Low-Power cw Lasers, Applied Spectrocopy, vol. 46, Issue 7, 1992, pp. 1085-1091. (Abstract Only) https://opg.optica.org/as/abstract.cfm?URl=as-46-7-1085.

Barnett, The Development of a Miniature Spatial Heterodyne Raman Spectrometer for Applications in Planetary Exploration and Other Extreme Environments, Doctoral Dissertation University of South Carolina, 2016, 142 Pages. https://scholarcommons.sc.edu/cgi/viewcontent.cgi?referer=&httpsredir=1&article=4943&context=etd.

Barnett et al., Miniature Spatial Heterodyne Raman Spectrometer with a Cell Phone Camera Detector, Applied Spectroscopy, vol. 71, Issue 5, 2016. (Abstract Only) https://journals.sagepub.com/doi/10.1177/0003702816665127.

Bartula et al., OH Absorption Spectroscopy in a Flame Using Spatial Heterodyne Spectroscopy, Applied Optics, vol. 46, No. 36, Dec. 20, 2007, pp. 535-840.

Batchelder et al., Molecular Imaging by Raman Microscopy, Advanced Materials, vol. 3, Issue 11, Nov. 1991, pp. 566-568. (Abstract Only) https://onlinelibrary.wiley.com/doi/abs/10.1002/adma.19910031112.

Bowden et al., Line-Scanned Micro Raman Spectroscopy Using a Cooled CCD Imaging Detector, Journal of Raman Spectroscopy, vol. 21, Issue 1, Jan. 1990, pp. 34-41. (Abstract Only) https://analyticalsciencejoumals.onlinelibrary.wiley.com/doi/abs/10_1002/jrs.1250210108.

Brenan et al., Chemical Imaging with a Confocal Scanning Fourier-Transform-Raman Microscope, Applied Optics, vol. 33, Issue 31, 1994, pp. 7520-7528. (Abstract Only) https://doi.org/10.1364/AO.33.007520.

B&WTEK, Laser Systems. Retrieved Feb. 14, 2023 from weblink https://bwtek.com/technology/lasers/.

Christensen et al., Raman Imaging Using a Tunable Dual-Stage Liquid Crystal Fabry-Perot Interferometer, Applied Spectroscopy, vol. 49, Issue 8, 1995, pp. 1120-1125. (Abstract Only) https://doi.org/10.1366/0003702953965155.

Dawson et al., Tunable, All-Reflective Spatial Heterodyne Spectrometer for Broadband Spectral Lines Studies in the Visible and Near-Ultraviolet, vol. 48, No. 21, Applied Optics, Jul. 20, 2009, pp. 4227-4238.

Delhaye et al., Raman Microprobe and Microscope with Laser Excitation, Journal of Raman Spectroscopy, vol. 3, Issue 1, Feb. 1975, pp. 33-43. (Abstract Only) https://doi.org/10.1002/jrs_1250030105.

Dwight et al., Lenslet Array Tunable Snapshot Imaging Spectrometer (LATIS) for Hyperspectral Fluorescence Microscopy, Biomedical Optics Express, vol. 8, Issue 3, 2017, pp. 1950-1964. https://doi.org/10.1364/BOE.8.001950.

Evans, The Birefringent Filter, Journal of the Optical Society of America, vol. 39, Issue 3, 1949, pp. 229-242. (Abstract Only) https://opg.optica.org/josa/abstract.cfm?URI=josa-39-3-229.

Gomer et al., Raman Spectroscopy Using a Spatial Heterodyne Spectrometer: Proof of Concept, Applied Spectroscopy, vol. 65, Issue 8, 2011, pp. 849-857. https://doi.org/10.1366/11-06298.

Gornushkin et al., Laser-Induced Breakdown Spectroscopy Combined with Spatial Heterodyne Spectroscopy, Applied Spectroscopy, vol. 68, Issue 9, 2014, pp. 1076-1084. (Abstract Only) https://opg.optica.org/as/abstract.cfm?URI=as-68-9.1076.

Harlander et al., Differential Field-Widened Spatial Heterodyne Spectrometer for Investigations at High Spectral Resolution of the Diffuse Far-Ultraviolet 1548-A Emission Line from the Interstellar Medium, Proc SPIE 2006, 1993, pp. 139-148. (Abstract Only) https://www.spiedigitallibrary.org/conference-proceedings-of-spie/2006/1/Differential-field-widened-spatial-heterodyne-spectrometer-for-investigations-at-high/10.1117/12.162827.short.

(56) References Cited

OTHER PUBLICATIONS

Harlander et al., Robust Monolithic Ultraviolet Interferometer for the SHIMMER Instrument on STPSat-1, Applied Optics, vol. 42, Issue 15, 2003, pp. 2829-2834. https://doi.org/10.1364/AO.42.002829.

Harlander, Spatial Heterodyne Spectroscopy: Interferometric Performance at Any Wavelength Without Scanning, Ph.D Thesis, The University of Wisconsin-Madison, Feb. 1991. (Abstract Only) https://ui.adsabs.harvard.edu/abs/1991PhDT . . . 62H/abstract.

Holospec Imaging Spectrograph, Operations Manual, Kaiser Optical Systems, Inc., Dec. 2002, 44 Pages. https://psfcsv10.psfc.mit.edu/~rowan/page4/page6/assets/HoloSpec_V2.pdf.

Krishnamurthy, Raman Spectrum of Crystalline Potassium Perchlorate, Proceedings of the Indian Academy of Sciences—Section A, vol. 61, 1965, pp. 118-121. https://www.ias.ac.in/article/fulltext/seca/061/02/0118-0121.

Lamsal et al., Deep-Ultraviolet Raman Measurements Using a Spatial Heterodyne Raman Spectrometer (SHRS), Applied Spectroscopy, vol. 69, Issue 5, 2015, pp. 525-534. (Abstract Only) https://opg.optica.org/as/abstract.cfm?URI=as-69-5-525.

Lamsal et al., Ultraviolet Stand-off Raman Measurements Using a Gated Spatial Heterodyne Raman Spectrometer, Appl Spectrosc, vol. 70, Issue 4, Apr. 2016, pp. 666-675. (Abstract Only) DOI: 10.1177/0003702816631304.

Lamsal et al., Visible and UV Standoff Raman Measurements in Ambient Light Conditions Using a Gated Spatial Heterodyne Raman Spectrometer, 46$^{th}$ Lunar and Planetary Science Conference, 2015, 2 Pages. https://www.hou.usra.edu/meetings/lpsc2015/pdf/1459.pdf.

Ma et al., Rapid Micro-Raman Imaging Using Fiber-Bundle Image Compression, Applied Spectroscopy, vol. 51, Issue 12, 1997, pp. 1845-1848. (Abstract Only) https://doi.org/10.1366/0003702971939668.

Matousek et al., Subsurface Probing in Diffusely Scattering Media Using Spatially Offset Raman Spectroscopy, Applied Spectroscopy, vol. 59, Issue 4, 2005, pp. 393-400. (Abstract Only) https://doi.org/10.1366/0003702053641450.

Morris et al., Liquid Crystal Tunable Filter Raman Chemical Imaging, Applied Spectroscopy, vol. 50, Issue 6, 1996, pp. 805-811. (Abstract Only) https_//doi_org/10.1366/0003702963905655.

NASA, Vision and Voyages for Planetary Science in the Decade 2013-2022, 398 Pages. Uploaded as Part A and Part B https://solarsystem.nasa.gov/resources/598/vision-and-voyages-for-planetary-science-in-the-decade-2013-2022/.

NASA, What are SmallSats and CubeSats?, 2015, NASA Science Instruments, 3 Pages. https://www.nasa.gov/content/what-are-smallsats-and-cubesats.

Nathaniel et al., Spatial Heterodyne Raman Spectroscopy, 42$^{nd}$ Lunar and Planetary Science Conference, The Woodlands, Texas, Mar. 7-11, 2011, 2 Pages.

Puppels et al., Direct Imaging Raman Microscope Based on Tunable Wavelength Excitation and Narrow-Band Emission Detection, Applied Spectroscopy, vol. 47, Issue 8, 1993, 1256-1267. (Abstract Only) https://doi.org/10.1366/0003702934068017.

Rousseau et al., Raman Spectrum of Crystalline Sodium Nitrate, Journal of Chemical Physics, vol. 48, Issue 8, 1968, pp. 3409-3413. (Abstract Only) https://doi.org/10.1063/1.1669635.

Saeed et al., Multispectrum, Spatially Addressable Polarization Interference Filter, Journal of the Optical Society of America A, vol. 19, Issue 11, 2002, pp. 2301-2312. (Abstract Only) https://opg.optica.org/josaa/abstract.cfm?URI=josaa-19-11-2301.

Sharma et al., Stand-Off Raman Spectroscopic Detection of Minerals on Planetary Surfaces, Spectrochimica Acta Part A, vol. 59, 2003, pp. 2391-2407.

Skinner et al., Remote Raman Microimaging Using an AOTF and a Spatially Coherent Microfiber Optical Probe, Applied Spectroscopy, vol. 50, Issue 8, 1996, pp. 1007-1014. (Abstract Only) https://opg.optica.org/as/abstract.cfm?URI=as-50-8-1007.

Solin et al., Raman Spectrum of Diamond, Physical Review B, vol. 1, 1970, pp. 1687-1698. (Abstract Only) https //doi_org/10.1103/PhysRevB_1.1687.

Stewart et al., Raman Imaging, Annual Review of Analytical Chemistry, vol. 5, 2012, pp. 337-360. (Abstract Only) https://doi.org/10.1146/annurev-anchem-062011-143152.

Stufflebeam, Surface and Gas-Phase Diagnostics for Solid Propellant Combustion, Contract/Grant DAAH04-94-C-0076, Report No. AD-A332800, ARO-32582.1-CH, Nov. 28, 1997.

Tiziani et al., Theoretical Analysis of Confocal Microscopy with Microlenses, Applied Optics, vol. 35, Issue 1, 1996, pp. 120-125. (Abstract Only) https://opg.optica.org/ao/abstract.cfm?URI=ao-35-1-120.

Tiziani et al., Three-Dimensional Analysis by a Microlens-Array Confocal Arrangement, Applied Optics, vol. 33, Issue 4, 1994, pp. 567-572. (Abstract Only) https://opg.optica.org/ao/abstract.cfm?URI=ao-33-4-567.

Treado et al., High-Fidelity Raman Imaging Spectrometry: A Rapid Method Using an Acousto-Optic Tunable Filter, Applied Spectroscopy, vol. 46, Issue 8, 1992, pp. 1211-1216. (Abstract Only) https://doi.org/10.1366/0003702924123980.

Treado et al., Near-Infrared Acousto-Optic Filtered Spectroscopic Microscopy: A Solid-State Approach to Chemical Imaging, Applied Spectroscopy, vol. 46, Issue 4, 1992, pp. 553-559. (Abstract Only) https://doi.org/10.1366/0003702924125032.

* cited by examiner

HYPERSPECTRAL IMAGING WITH A SPATIAL HETERODYNE SPECTROMETER

RELATED APPLICATIONS

The present application claims priority to U.S. Provisional Application Ser. No. 62/933,732, filed on Nov. 11, 2019, and claims priority to, and is a divisional of, U.S. patent application Ser. No. 17/772,265, filed on Apr. 27, 2022, both of which are fully incorporated herein in their its entireties by reference hereto and for all purposes.

STATEMENT AS TO RIGHTS TO INVENTIONS MADE UNDER FEDERALLY SPONSORED RESEARCH

This invention was made with Government support under Grant No. OCE1829333, awarded by the National Science Foundation, and Grant No. 80NSSC19K1024, awarded by the National Aeronautics and Space Administration. The Government has certain rights in the invention.

BACKGROUND

There is a continuing need for optical systems that can interrogate a mixed sample and identify chemical constituents, particularly when the sample is heterogeneous, and the interrogation can be done without sample preparation. The interaction of light with a sample by scattering, absorption and emission (i.e., light products) provides spectral 'fingerprints' that can be used to identify and quantify the chemical composition in a sample. Optical interrogation systems enable new off-line, real-time, and in-situ, on-line, or in-line measurement capabilities that benefit many branches of science including biology, medicine, material, forensics, and chemistry. One specific area that has benefited greatly from advances in measurement science is industrial process analysis, which supports process applications in the pharmaceutical industry, the manufacturing of materials, and as part of the feedback and control in certain chemical processes. Of particular interest is mapping the identity, concentrations, and temporal and/or spatial changes of chemical constituents using spectroscopic imaging.

Hyperspectral imaging is the practice of recording multiple spectral band intensities for several select spatial points on an object (i.e., sample). Hyperspectral imaging has been described using Raman spectroscopy, laser-induced breakdown spectroscopy (LIBS), as well as luminescence. To date, hyperspectral Raman techniques have relied on scanning instruments, where spectra are acquired using a spectrometer for one spatial point at a time, as the excitation laser is scanned from point to point on the sample. The spectra for every point are then mapped to generate a map of spectral intensity as a function of wavelength and position, the hypercube of data. For point-by-point scanning, the laser can be focused to a small spot, and the sample raster scanned through the laser beam, collecting a spectrum at each point. Alternatively, the laser can be focused to a thin line, using cylindrical optics, and the Raman scattering imaged onto the slit of a dispersive spectrometer. Another approach is to illuminate the whole sample using an expanded laser spot and a series of two-dimensional (2D) images are acquired using a tunable filter. Various types of filters have been used in this method, including dielectric filters, acousto-optic, and liquid-crystal tunable filters. In another approach, fiber optic arrays have been used, where spatial and spectral information were simultaneously acquired. However, the number of spatial points demonstrated using a fiber array is low and the fiber fill factor is also low providing a relatively weak signal. The prior art has several limitations, particularly the need to trade time resolution for both spectral and spatial data density.

There is a need for an apparatus and method enabling rapid and simultaneous image acquisition with complete spectral information. The present inventors have demonstrated that Spatial Heterodyne Raman Spectrometers (SHRS) and Spatial Heterodyne LIBS Spectrometers (SHLS) are especially suited for addressing the limitations described above and for enabling encoding the light product received from an object to obtain low-resolution or high-resolution spectra simultaneously at many spatially isolated locations on the object. This is possible because the spatial heterodyne spectrometer (SHS) has the unique property of allowing many spatially isolated beams of light to be simultaneously measured, by illuminating each beam of light onto a separate region of the SHS diffraction grating or gratings, or other alternate dispersive element, and onto separate regions of the charge-coupled device (CCD), intensified charge-coupled device (ICCD), complementary metal-oxide semiconductor (CMOS) detector or other type of array detector. As a proof of demonstration, the present inventors have used a microlens array (MLA) with a SHRS for the simultaneous acquisition of hyperspectral images resulting in a complete Raman spectrum at numerous spatially isolated object locations using a single acquisition or single laser pulse. This allows complete image acquisition with corresponding complete spectral information simultaneously and in seconds to minutes rather than hours that can be required using current, prior art hyperspectral Raman techniques. Furthermore, use of a single acquisition or single laser shot (e.g., laser pulse) mitigates degradation of the object (i.e., sample) as might occur from repeated or prolonged exposure to intense laser light.

It can be advantageous to isolate the array detector from the other components of the SHRS and SHLS. Fiber optic waveguides can be used for this purpose. Fiber optic waveguides can also be used to transfer the image of the MLA to the input of the SHRS and SHLS.

In addition to utilizing MLAs or waveguides, further improvements can be made to the hyperspectral design by incorporating features to increase the robustness and performance. Monolithic SHRS and SHLS designs, as opposed to free space (e.g., where components are individually mounted) optical SHS configurations, are fabricated from bonded (e.g., optically contacted, epoxied, cemented) components of quartz, fused silica, BK7, other types of glasses or combinations thereof. This maintains the pre-alignment of components and greatly expands their potential use for applications such as, for example, industrial process analysis. The monolithic design, which can be made small relative to a conventional spectrometer of similar resolving power, can enable simultaneous measurements of many processes or redundant measurements of the same process, similar to imaging described above. This can be achieved while still maintaining a large spectral range by the use of array detectors with very small pixel dimensions, such as CMOS detectors. The spectral range of the SHRS has also been shown to be approximately doubled by using a 2D SHS, where one grating is tilted vertically to remove the redundancy of Raman bands above and below Littrow. Alternatively, as we show in this disclosure, one grating can instead be rotated about the grating normal, as opposed to tilted, to remove the said degeneracy to achieve the similar approximate doubling of the spectral range. This has the added benefit of improving manufacturability and assembly/alignment of the monolithic SHS device.

SUMMARY OF THE PRESENTLY DISCLOSED SUBJECT MATTER

Objects and advantages of the presently disclosed subject matter will be set forth in part in the following description, or may be obvious from the description, or may be learned through practice of the presently disclosed subject matter. The presently disclosed subject matter will be described in greater detail below by reference to embodiments thereof illustrated in the figures.

The presently disclosed subject matter provides embodiments of an optical device and apparatus that enable hyperspectral measurements, which is described herein as producing and simultaneously acquiring spatially isolated Fizeau fringe patterns each having an encoded light product that can be decoded to produce a spectral fingerprint of the interrogated object (i.e., sample).

In one particular embodiment, the presently disclosed subject matter includes an optical apparatus for producing and simultaneously acquiring at least two spatially isolated Fizeau fringe patterns each having an encoded light product formed as a result of receiving a light product from at least one object. Further, the optical apparatus includes at least one spatial heterodyne spectrometer constructed to receive at least two light input beams and produce, from each said light input beam, two corresponding light output beams of said spatially isolated Fizeau fringe patterns; wherein the at least one spatial heterodyne spectrometer comprises a beam splitter for directing the light product and subsequently recombining, and one or more diffraction gratings, wherein the diffraction gratings are configured to adjust a wavelength of the light product; an optical element for receiving the light product from the at least one object and produce the at least two light input beams to the at least one spatial heterodyne spectrometer; a means for directing at least one excitation source to interact with the at least one object to produce the light product; and at least one detector array and at least one optical element for imaging the at least two spatially isolated Fizeau fringe patterns.

In another embodiment, the presently disclosed subject matter is directed to a device for imaging a sample. The device includes comprising an excitation source; a spatial heterodyne spectrometer; and a microlens array; wherein the microlens array and a surface of the sample to be imaged are arranged in parallel, and wherein the microlens array collects light from different regions of the surface of the sample.

In still another embodiment, the presently disclosed subject matter also contemplates a method for forming a hyperspectral image via spatial heterodyne Raman spectroscopy. The method includes illuminating a sample with wavelengths from an excitation source; utilizing a microlens array, wherein the microlens array and a surface of the sample to be imaged are arranged in parallel, and wherein the microlens array collects light from different regions of the surface of the sample; and utilizing a spatial heterodyne spectrometer configured to receive a signal from the microlens array.

In yet another embodiment, the presently disclosed subject matter contemplates a device that includes an excitation source; a spatial heterodyne spectrometer comprised of a beam splitter and a pair of diffraction gratings; and one or more additional diffraction gratings.

In an additional embodiment, the presently disclosed subject matter provides a method for spectroscopy that includes illuminating a sample with wavelengths from an excitation source; utilizing a spatial heterodyne spectrometer comprised of a beam splitter and a pair of original diffraction gratings; and utilizing one or more additional diffraction gratings to increase the spectral range or measure two spectral ranges.

Embodiments of the presently disclosed subject matter include spatial heterodyne spectrometers (SHS) constructed to receive at least two light input beams and produce two corresponding light output beams for each light input beam that, upon recombination, produce spatially isolated Fizeau fringe patterns. The SHS may also encompass an optical filter(s) and coating(s) and/or a spatial filter(s). An optical element consisting of, but not limited to, a lens, lens array, MLA, or one of several types of waveguides that acts as a means for receiving the light product (e.g., Raman and/or LIBS wavelengths) from the object and for delivering to the SHS entrance aperture. The optical element may also encompass an optical filter(s) and a coating(s) and/or a spatial filter(s). An excitation source (e.g., a source of light, a source of electromagnetic radiation including, but not limited to, a laser source, light emitting diode) interacts with the object to produce the light product (i.e., Raman and/or LIBS wavelengths). The use of a single or multiple detector array is for recording the spatially isolated Fizeau fringe patterns. The embodiments using a first-rotated or first-tilted grating with respect to a second grating enhance the spectral range by inducing a phase shift along the y-axis, enabling differentiation of spectra on either side of the Littrow (i.e., heterodyne) wavelength via decoding with a 2D Fourier transform method, which may result in an approximate doubling of the spectral range.

A variety of spectroscopic techniques can be performed with this hyperspectral apparatus separate or in parallel including, but not limited to, Raman and laser-induced breakdown spectroscopy (LIBS).

In one particular embodiment of the presently disclosed subject matter, an image transfer optical element including, but not limited to, optical fibers, fiber optic image conduit, fiber optic taper, fiber optic faceplate, or other coherent arrangement is used to relay the spatially-isolated Fizeau fringe patterns to the detector array, which may be located some distance away from the SHS.

In one particular embodiment of the presently disclosed subject matter, a device for simultaneously imaging spatially isolated Fizeau fringe patterns from a sample is provided. The device includes an excitation source (e.g., a light source, source of electromagnetic radiation, etc.), a spatial heterodyne spectrometer, and a microlens array (MLA), where the MLA is arranged in line of sight of the sample to be measured, and where the MLA collects light from different regions of the sample.

In one embodiment, the excitation source can be a light emitting diode, laser source, coherent source, incoherent source, or combinations thereof.

In another embodiment, the spatial heterodyne spectrometer is configured to receive emission wavelengths from the sample. For example, the device may include one or more band pass filters and blocking filters in such an embodiment, which are configured to remove the light outside the emission wavelengths.

In yet another embodiment, the spatial heterodyne spectrometer is configured to receive Raman wavelengths from the sample. For example, the device may include one or more band pass filters and blocking filters in such an embodiment, which are configured to remove the light outside the Raman wavelengths.

In one more embodiment, the device is further comprised of a charge-coupled device configured to collect Raman wavelengths or emission wavelengths or combinations thereof.

In another embodiment, the spatial heterodyne spectrometer is further comprised of two diffraction gratings or two dispersive prisms, the diffraction gratings or dispersive prisms configured to adjust Raman wavelengths. For example, in such an embodiment, the Littrow angle of the diffraction gratings or the dispersive prisms is adjustable. Also, in a different such embodiment, the spatial heterodyne spectrometer is further comprised of one or more prisms to adjust an acceptance angle of the light from the sample.

In another embodiment, the spatial heterodyne spectrometer is further comprised of a diffraction grating or dispersive prism and at least one reflective optic (e.g., mirror), the diffraction grating or dispersive prism and reflective optic configured to adjust Raman wavelengths. For example, in such an embodiment, the Littrow angle of the diffraction grating or the dispersive prism is adjustable. Also, in a different such embodiment, the spatial heterodyne spectrometer is further comprised of one or more prisms to adjust an acceptance angle of the light from the sample.

In yet another embodiment, the device contains transfer optics, defined as one or more collection lenses or apertures, for directing the light product from the MLA to within an acceptance angle of the spatial heterodyne spectrometer. As an example, in such an embodiment, a relay lens may be positioned two focal lengths from the MLA and two focal lengths from an aperture of the spatial heterodyne spectrometer. In a different such embodiment, the center of the MLA must be aligned with the center of the relay lens.

In an additional embodiment, the MLA magnifies an image of the sample.

In one more embodiment, a method for forming a hyperspectral image using spatial heterodyne Raman spectroscopy is provided. The method includes illuminating a sample with wavelengths from an excitation source (e.g., a light source, source of electromagnetic radiation, etc.); utilizing a MLA, where the MLA is in line of sight of the sample to be measured, and where the MLA collects light from different regions of the sample; and utilizing a spatial heterodyne spectrometer.

In one embodiment, the excitation source can be a light emitting diode, laser source, coherent source, incoherent source, or combinations thereof.

In yet another embodiment, the spatial heterodyne spectrometer is configured to receive Raman wavelengths (i.e., light product) from the sample. For example, the method may include the use of one or more band pass filters and blocking filters in such an embodiment, which are configured to remove the light outside the Raman wavelengths.

In still another embodiment, the MLA adjusts the light product from the sample into unique spatially resolved regions and directs the light product to the spatial heterodyne aperture. For example, in one such embodiment, Fourier transform methods are performed upon the unique spatially isolated Fizeau fringe patterns recorded by the array detector.

In another embodiment, Raman spectra, for points (i.e., spatially isolated Fizeau fringe pattern) in the hyperspectral image, are decoded using a Fourier transform method.

In yet another embodiment, the method includes the use of transfer optics, which included, but is not limited to, one or more collection lenses or apertures for directing the light product from the object from the MLA to within an acceptance angle of the spatial heterodyne spectrometer. For example, in such an embodiment, a relay lens may be positioned two focal lengths from the MLA and two focal lengths from an aperture of the spatial heterodyne spectrometer. In a different such embodiment, the center of the MLA can be aligned with the center of the relay lens.

In yet another embodiment, the excitation source is a pulsed laser.

In one particular embodiment of the presently disclosed subject matter, a device for hyperspectral imaging across an expanded portion of the SHS grating aperture width and height dimension is provided. The device includes an excitation source and a spatial heterodyne spectrometer comprised of a beam splitter and a pair of diffraction gratings with additional gratings positioned adjacently such that the periodic structured surface of each adjacently positioned grating is stepped (i.e., offset a predetermined distance) to adjust for pathlength differences across a portion of or across the entire grating aperture along the dimension parallel or perpendicular to the grating dispersion, where it is to be understood that the grating aperture refers to the grating area that is useable in the SHS, which in some examples represents apertures of approximately 17×17 $mm^2$, although other grating areas are contemplated by the presently disclosed subject matter as would be understood by one of ordinary skill in the art. Adjusting for pathlength differences along the dimension parallel to the grating dispersion is the preferred implementation for a non-tilted (i.e., rotated) grating SHS design. Adjusting for pathlength differences along the dimension parallel and perpendicular to the grating dispersion is the preferred implementation for a tilted (i.e., non-rotated) grating SHS design. This is more challenging to implement for the tilted grating, which is one reason for utilizing a rotated grating approach as disclosed herein.

In another particular embodiment of the presently disclosed subject matter, the aforementioned stepped approach is accomplished in a different way where the SHS comprises two single gratings having one or more stepped periodic structured surfaces. Further, it is also to be understood that the aforementioned adjustment for pathlength differences across a portion of or across the entire grating aperture can be accomplished in a different way where a refractive optic is configured between the beam splitter and diffraction gratings.

In one embodiment, the excitation source can be a light emitting diode, laser source, coherent source, incoherent source, or combinations thereof.

In another embodiment, the spatial heterodyne spectrometer is a monolithic spatial heterodyne spectrometer.

In yet another embodiment, one or more additional diffraction gratings are adjacently positioned.

In one other embodiment, a different Littrow wavelength for each of the additional diffraction gratings is selected by adjusting a grating angle of each of the additional diffraction gratings individually relative to each other and relative to the grating angle of the pair of diffraction gratings in the spatial heterodyne spectrometer.

In another embodiment, each of the additional diffraction gratings has a unique groove density relative to each other and relative to the groove density of the pair of diffraction gratings in the spatial heterodyne spectrometer.

In another embodiment, the encoded light product can be decoded using a Fourier transform method or other decoding methods.

In one particular embodiment, a method for spectroscopy is provided. The method includes illuminating a sample with wavelengths from an excitation source; utilizing a spatial heterodyne spectrometer comprised of a beam splitter and a pair of diffraction gratings; and utilizing one or more additional diffraction gratings.

In another embodiment, the additional diffraction gratings are adjacently positioned.

Also, in a further embodiment, a different Littrow wavelength for each of the additional diffraction gratings is selected by adjusting the grating angle of each diffraction grating individually relative to each other and relative to the grating angle of the diffraction gratings of the spatial heterodyne spectrometer.

In a different embodiment, each of the additional diffraction gratings has a unique groove density relative to each other and relative to the groove density of the pair of diffraction gratings of the spatial heterodyne spectrometer.

In yet another embodiment, the method further comprises performing Fourier transforms of the image.

These and other features, aspects and advantages of the presently disclosed subject matter will become better understood with reference to the following description and appended claims. The accompanying figures, which are incorporated in and constitute a part of this specification, illustrate embodiments of the presently disclosed subject matter and, together with the description, serve to explain the principles of the presently disclosed subject matter.

BRIEF DESCRIPTION OF THE DRAWINGS

A full and enabling disclosure of the presently disclosed subject matter to one skilled in the art, including the best mode thereof, is set forth more particularly in the remainder of the specification, including reference to the accompanying figures, in which.

Figure 1A:
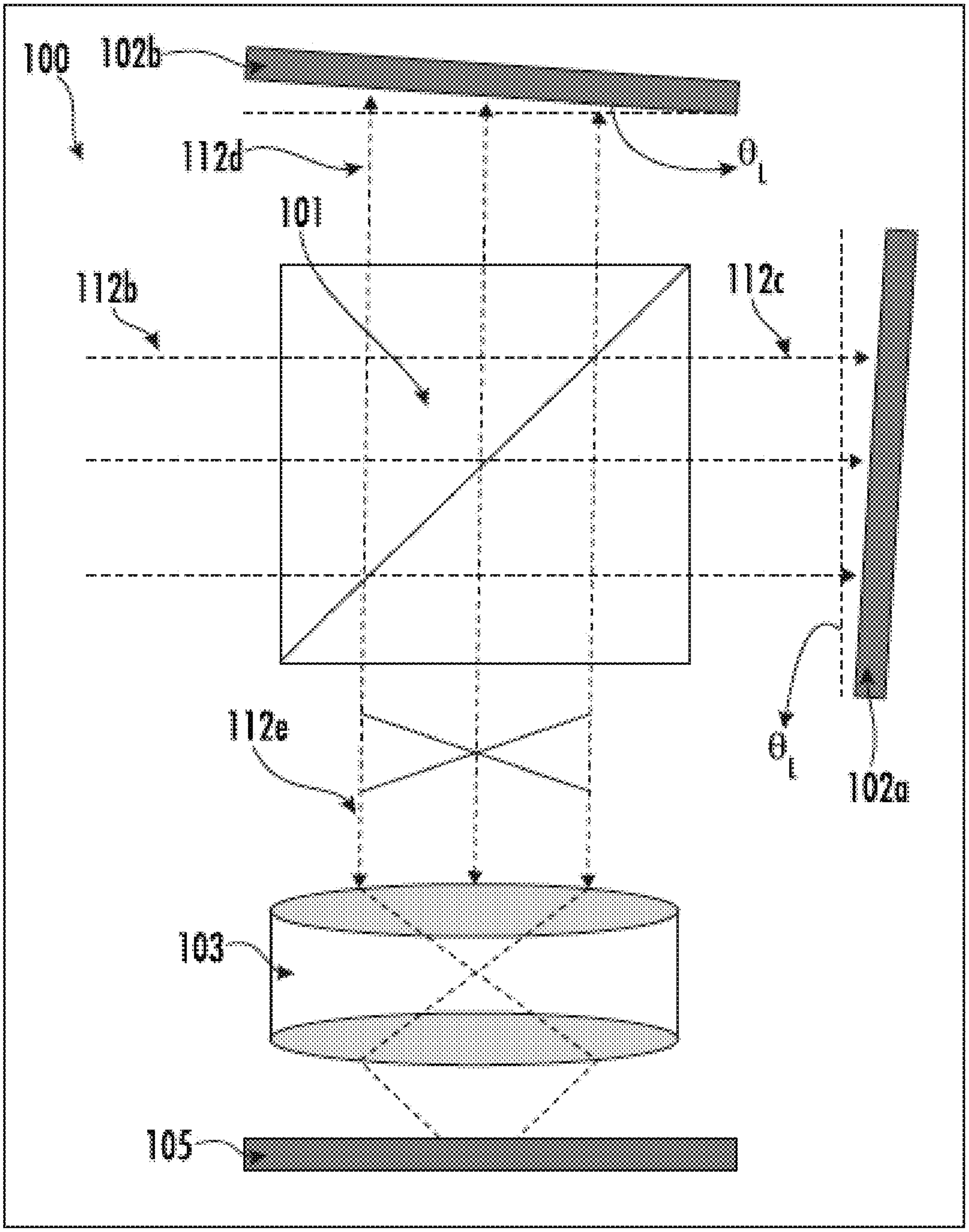
Fig. 1A (Prior Art)
FIG. 1A illustrates one embodiment of a spatial heterodyne Raman spectrometer with its constituent components that is contemplated for use in the presently disclosed subject matter.

Repeat use of reference characters in the present specification and drawings is intended to represent the same or analogous features, elements, or steps of the presently disclosed subject matter.

DETAILED DESCRIPTION

Reference now will be made to the embodiments of the presently disclosed subject matter, one or more examples of which are set forth below. Each example is provided by way of an explanation of the presently disclosed subject matter, not as a limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as one embodiment can be used on another embodiment to yield still a further embodiment. Thus, it is intended that the presently disclosed subject matter cover such modifications and variations as come within the scope of the appended claims and their equivalents. It is to be understood by one of ordinary skill in the art that the present discussion is a description of exemplary embodiments only and is not intended as limiting the broader aspects of the presently disclosed subject matter, which broader aspects are embodied exemplary constructions.

As used herein, the terms "about," "approximately," or "generally," when used to modify a value, indicates that the value can be raised or lowered by 5% and remain within the disclosed embodiment.

The presently disclosed subject matter greatly improves the usability and practicability of prior art spatial heterodyne spectrometers (SHSs) and, in particular, spatial heterodyne Raman spectrometers (SHRSs) and spatial heterodyne LIBS spectrometers (SHLSs) by first, enabling the equivalent approximate doubling of the spectral range using the new rotated grating approach versus the prior art tilted grating approach, thereby maintaining the equivalent SHS pathlength differences along the vertical (perpendicular to the grating dispersion) dimension to enable hyperspectral imaging preferably over the entire vertical dimension of the grating aperture of the SHS device. Second, the stepped grating SHS design approach disclosed herein maintains the equivalent SHS pathlength differences along the horizontal (parallel to the grating dispersion) dimension to enable hyperspectral imaging preferably over the entire horizontal dimension of the grating aperture of the SHS device. Third, when the stepped grating SHS design approach is combined with the rotated grating SHS design approach into a single SHS device, hyperspectral imaging is enabled preferably over the entire vertical and horizontal dimensions of the grating aperture of the SHS device while also enabling the approximate doubling of the spectral range.

The prior art for hyperspectral techniques has several limitations, in particular the need to trade time resolution for both spectral and spatial data density. The presently disclosed subject matter overcomes the limitations of all prior art hyperspectral techniques by enabling simultaneous acquisition of hyperspectral images resulting in a complete Raman (or LIBS) spectrum at numerous spatially isolated object locations using a single acquisition or single laser pulse. This allows complete image acquisition with corresponding complete spectral information simultaneously. Furthermore, use of a single acquisition or single laser shot (e.g., laser pulse) mitigates degradation of the sample as might occur from repeated or prolonged exposure to intense laser light.

Specifically, the presently disclosed subject matter enables encoding the light product received from an object in a single acquisition or single laser pulse to obtain low- or high-resolution spectra simultaneously at many spatially isolated locations on the sample. This is possible because the SHS has the unique property of allowing many spatially isolated beams of light to be simultaneously measured, by illuminating each beam of light onto a separate region of the SHS diffraction grating or gratings, or other alternate dispersive element, and onto separate regions of the CCD, ICCD, CMOS detector, or other type of array detector.

In one embodiment, we show that by using a microlens array (MLA) in combination with a SHS, the presently disclosed subject matter can capture data for a plethora of points on the sample with a single acquisition or single laser shot. Furthermore, additional diffraction gratings can be added and imaged in order to enable hyperspectral imaging across an expanded portion of the SHS grating aperture by adjusting pathlength differences. Furthermore, one grating can be rotated about the grating normal, as opposed to tilting, to enable an approximate doubling of the spectral range. These improvements represent a significant advancement over all the prior art.

In an exemplary embodiment, the presently disclosed subject matter contemplates the use of a prior art (SHRS) (100), as depicted in FIG. 1A. The SHRS (100) is a dispersive interferometer that uses a pair of stationary reflective diffraction gratings (102*a*, 102*b*). The light beam(s) (112*b*, 118) enters the input aperture (106) of the SHRS where it is split into two output beams (112*c*, 112*d*) by a preferably 50:50, beamsplitter (101). These two output beams strike the stationary diffraction gratings (102*a*, 102*b*), which are adjusted at a predetermined Littrow angle, $\theta_L$, such that one particular wavelength is retro-reflected along the incident light path (112*c* and 112*d*) and recombines at the beamsplitter (101). As shown in FIG. 1C, heterodyning in the interferometer occurs at the Littrow wavelength, $\lambda_L$, corresponding to the wavelength of light that is exactly retro-reflected back along the same path (121), and hence, recombines at the beamsplitter (101, see FIG. 1A) without interference. The Littrow configuration angle ($\theta_L$) is determined relative to a line normal (122) to the surface of the diffraction grating (125). When in a Littrow configuration, the Littrow configuration angle, $\theta_L$, will be equal to the angle of the blazings, $\theta_B$, and will also be normal (121) to the blazed surface (127). Also, in such a configuration, the incident angle ($\theta_I$) and the diffraction angle ($\theta_D$) are equal to the Littrow configuration angle ($\theta_L$). The Littrow configuration angle and the Littrow wavelength are related by Equation 3 below. For any wavelength other than the Littrow wavelength, as illustrated in FIG. 1D, the incident light (123) strikes the surface (127) of the periodic structured blazings (126) at an angle ($\theta_I$) to the optical axis (122). Diffracted light (124) leaves the surface (127) of the blazings (126) on the diffraction gratings (102) at an angle ($\theta_D$) to the optical axis (122), resulting in crossed wavefronts, inducing a spatial phase shift, and generating an interference pattern, which produces a series of wavelength dependent fringes on the array detector. The fringe spatial frequency on the detector is given by Equation 1, where f is in fringes/cm and σ is the wavelength expressed in wavenumbers. A Fourier transform of the interferogram decodes and recovers the spectrum.

$$f = 4(\sigma - \sigma_L)\tan\theta_L \tag{1}$$

$$\Omega_{max} = 2\pi/R \tag{2}$$

$$\theta_L = \arcsin(m\lambda_L/2d) \tag{3}$$

According to Equation 1, emission lines above or below the Littrow wavelength may show identical fringe patterns and can lead to degenerate lines (i.e., line overlap). This degeneracy can be removed by tilting one of the gratings vertically, which induces a rotation to the interferogram (i.e., Fizeau fringe pattern), in opposite directions above and below Littrow. In this case, a 2D Fourier transform can be used to recover spectra above and below the Littrow wavelength unambiguously. This technique can be used to approximately double the spectral range of the SHRS.

In an alternative embodiment, the presently disclosed subject matter utilizes a grating rotation, where the grooves of the grating are rotated with respect to the grooves on the other grating, which are vertical. While there are different ways to achieve this grating rotation—preinstalling the grating in the glass housing with the desired rotation or preinstalling the grating with vertical grooves and then rotating the glass housing—the key concept here is that one set of grooves are rotated (and not tilted) versus the other set of grooves.

The SHRS, like other Fourier transform interferometers, does not require a narrow slit to achieve high resolution as is common with dispersive spectrometers because there is only a weak dependence of resolution on entrance aperture width. This allows the SHRS to employ very large entrance apertures, greatly increasing the throughput of the system, which is advantageous when signal strength of the light product is low and also for imaging applications.

In the described embodiment of the SHRS (100), the resolving power is equal to the number of grating grooves illuminated, in this case R=10,800, giving a theoretical resolution of about 0.05 nm (1.7 $cm^{-1}$) at 532 nm. The active area of the charge coupled device (CCD) detector (105) is about 16.2 mm or about 1200 pixels; therefore, the theoretical spectral range of the SHRS, based on the Nyquist criteria of 2 pixels per wavelength, is about 30 nm (1073 $cm^{-1}$). The useful spectral range is only about ⅔ this value because the instrument response drops quickly at wavelengths far from the Littrow setting. This spectral range can be roughly doubled (to about 60 nm or 2145 $cm^{-1}$) by tilting or by rotating one of the gratings slightly (with respect to the other grating) and using a 2D Fourier transform to recover wavelengths both above and below the Littrow wavelength, unambiguously. The maximum, resolution-limited solid angle field of view (FOV) of the SHRS is related to the resolving power by Equation 2 above. Thus, the solid angle FOV for an exemplary embodiment without field widening prisms is about $5.8\times10^{-4}$ sr, and the full acceptance angle is about 1.4°. The addition of field widening prisms, another embodiment, offers several advantages including an increased acceptance angle.

Figure 1B:
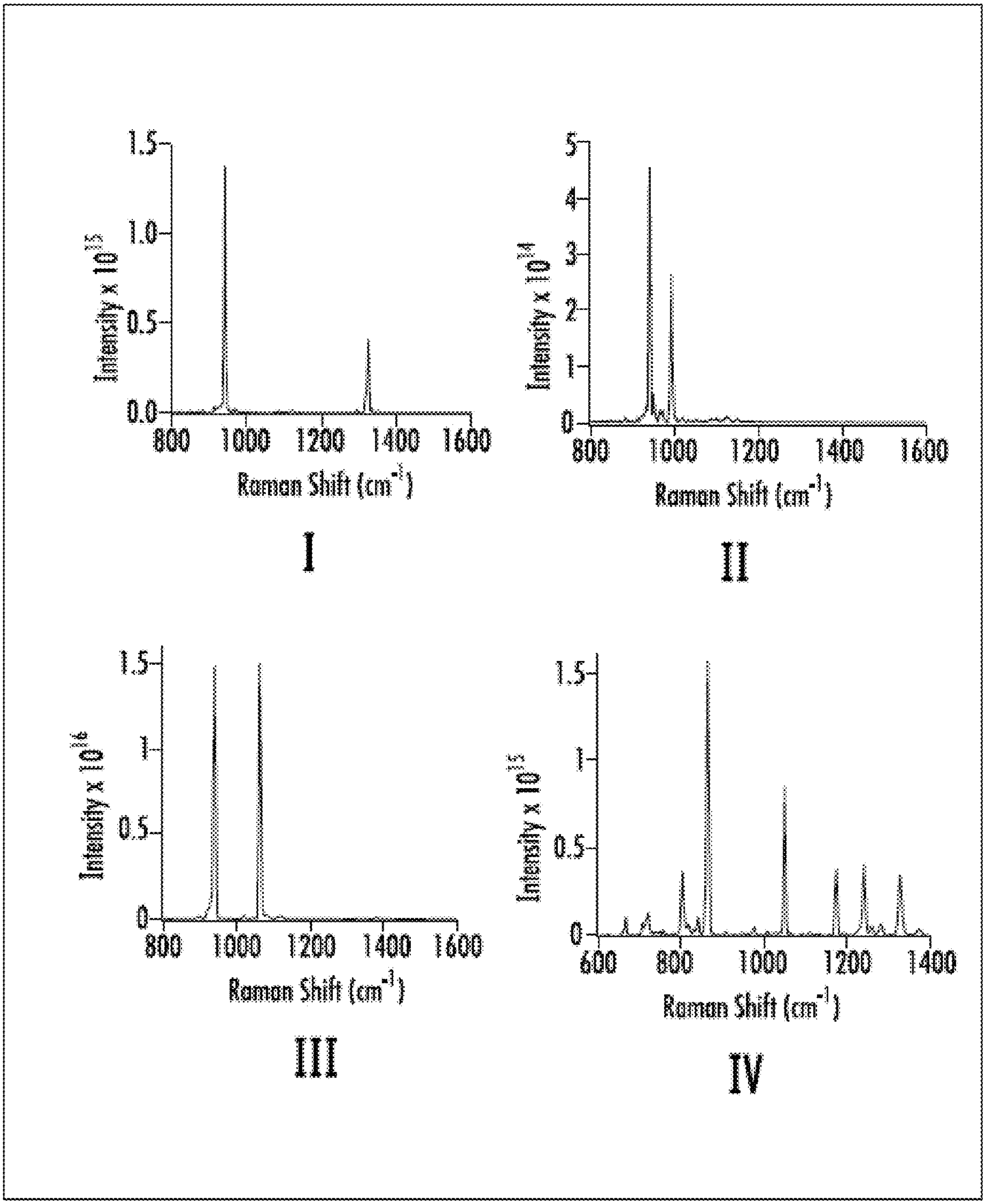
FIG. 1B illustrates the Raman spectra results from a traditional SHRS for (I) a diamond in potassium perchlorate pellet; (II) a sodium sulfate and potassium perchlorate bilayer pellet; (III) a sodium nitrate and potassium perchlorate bilayer pellet; and (IV) an acetaminophen and ammonium nitrate bilayer pellet.
Figure 1C:
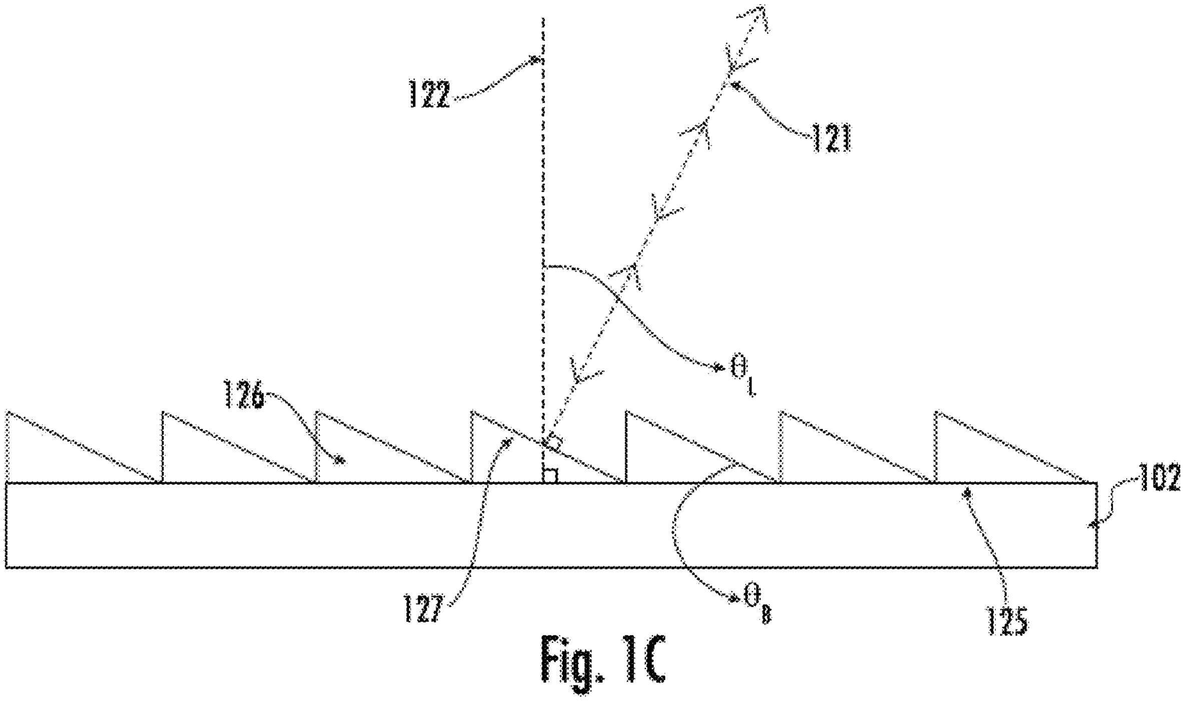
FIG. 1C illustrates the Littrow configuration of a diffraction grating in a SHRS.
Figure 1D:
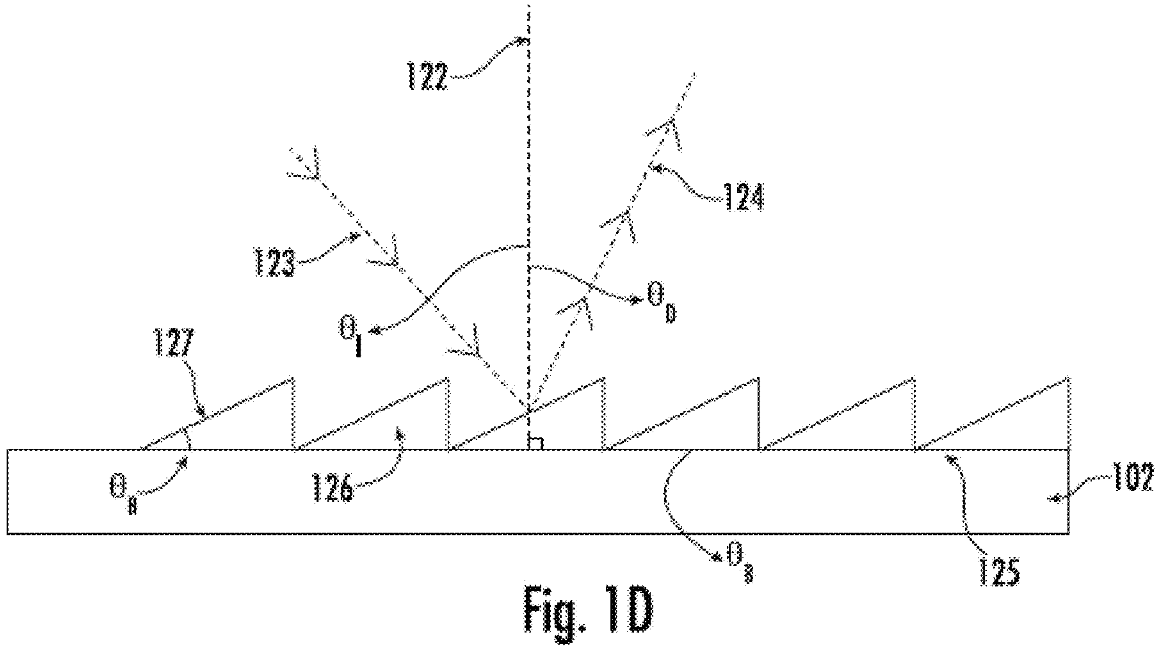
FIG. 1D illustrates a path of light (i.e., photons) that strikes a diffraction grating in a SHRS at a wavelength other than the Littrow wavelength.

FIG. 1B shows Raman spectra measured by the traditional SHRS (100) for (I) a diamond in potassium perchlorate pellet, (II) a sodium sulfate/potassium perchlorate bilayer pellet, (III) a sodium nitrate/potassium perchlorate bilayer pellet, and (IV) an acetaminophen/ammonium nitrate bilayer pellet. The pellets were illuminated with 150 mW of continuous 532 nm laser at the interface where the two solids meet. The measured resolution for these Raman bands was about 7 $cm^{-1}$ using 300 gr/mm gratings. In this example, the 2D spatial information was lost and a mean spectrum across the image is obtained.

Figure 2A:
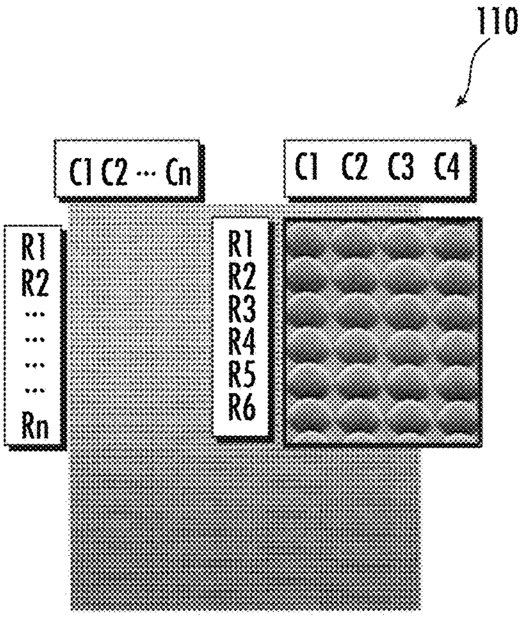
FIG. 2A shows one microlens array (MLA) contemplated for use in the system of the presently disclosed subject matter; the MLA is a 40 lenslet by 40 lenslet MLA with 1600 lenslets total; the lenslets have a diameter of 100 μm each and a focal length, $f_m$, of 1.4 mm or f/16, for a 1× magnification setup; the inset image shows a 6 row by 4 column magnified section of the MLA.
Figure 2B:
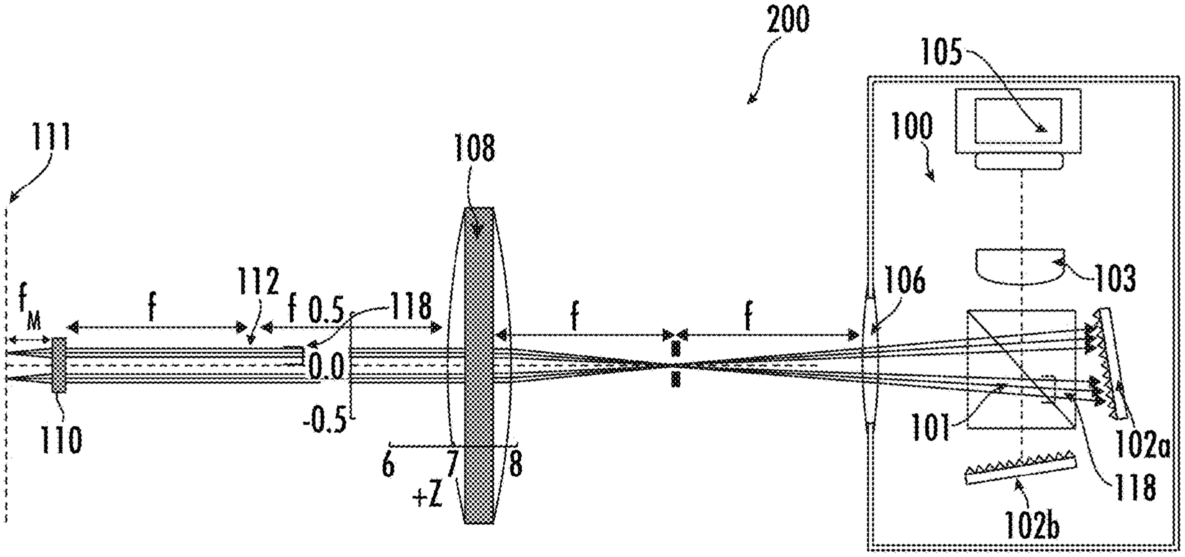
FIG. 2B illustrates a detailed diagram of the presently disclosed subject matter configured with an MLA; the MLA of FIG. 2A or any other suitable MLA or waveguide of various types is located before the SHS entrance aperture and in line of sight of the sample; the light product originates from sample, which is being interrogated by the source of electromagnetic radiation and collected at the focal point of the MLA, allowing light beams to exit the back surface of the MLA; the light beams from each lenslet remains separated in space allowing spatial-spectral information to be retained; the light path is focused by another lens before entering the SHRS; filters of various types (not illustrated) are also present in the optical path.

The presently disclosed subject matter is shown in the system (200) in FIG. 2B and utilizes the SHRS (100) shown in FIG. 1A. An area (111*a*) of the sample to be imaged (111) is located at the focal point of an MLA (110), $f_m$, which is both illuminating the sample and collecting the signal of the light product. When a relay lens (108) images the back surface of the MLA (110) onto the SHRS diffraction grating (102*a*, 102*b*) faces, the light beams from each lenslet remains separate in space (112*b*, 118). Because the SHRS has a large entrance aperture (106), the individual lenslet light beams can enter the SHRS without interfering with each other (112), which means that spatial-spectral information is retained. When the array of lenslet light beams (118) enters into and is acted on by the SHRS, an interference pattern (i.e., Fizeau fringe pattern) forms for each individual lenslet. Without the MLA, spatial information is lost, and the mean spectrum is obtained.

It is critical that the light enters the SHRS (100) aperture (106) either collimated or within the acceptance angle of the SHRS (100). This can be achieved using a variety of different embodiments. In the demonstrated embodiment of FIG. 2B, the relay lens (108) is two focal lengths from the MLA (110). The MLA lenslets have a focal length, $f_m$, which is the distance the lenslets are from the sample. In some embodiments, the center of the MLA (110) must align with the focal point of the relaying lens (108). The relay lens (108) is also positioned two focal lengths from entrance aperture (106) of the SHRS (100) and focuses the light at a point one focal length from the entrance aperture (106).

Figure 15:
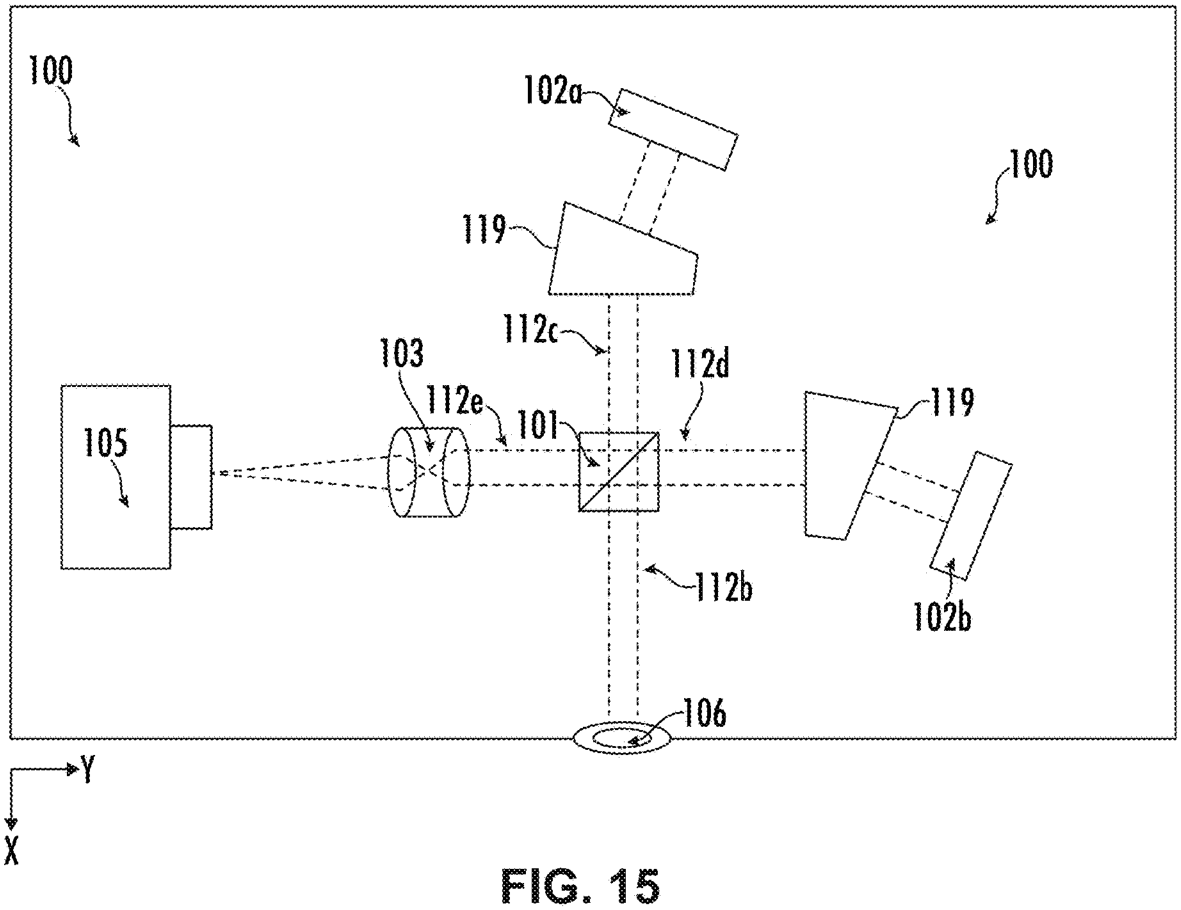
FIG. 15 is a diagram of a spatial heterodyne spectrometer with wedge prisms used to increase the acceptance angle of the incoming signal.

In one embodiment, shown in FIG. 15, wedge prisms (119) can be used in the SHRS (100) in order to increase the acceptance angle. This can increase the acceptance angle from about 0.1° to about 20°, about 0.5° to about 15°, or about 2.5° to about 10°. Other embodiments of the above transfer lens setup (114) would be apparent to those familiar in the art and could include two or more relaying or collimating lenses. Increasing the acceptance angle allows for the light from each lenslet to remain separate in space. Without a wide acceptance angle, the light of each lenslet would overlap, and individual spectrums for different points on the sample could not be obtained.

As shown in FIG. 2A, the MLA (110) can contain a number of different lenslets depending on the necessary spatial resolution. An MLA (110) in a 2 lenslet by 2 lenslet configuration yields 4 individual beams. Other embodiments shown here include up to a 40 lenslet by 40 lenslet array with 1600 lenslets total. Still further embodiments can have lenslet arrays ranging between 2×2 to 1000×1000, 3×3 to 200×200, and 4×4 to 100×100. The magnification of the MLA can vary depending on the application. Changing the magnification allows control over performance characteristics such as the area viewed on the sample or resolving power. Magnification in various embodiments could range from about 1× to about 100×, such as from about 5× to about 50×, such as from about 8× to about 12×. The lenslets can also have a variety of diameters ranging from about 25 microns to about 175 microns, such as from about 50 microns to about 150 microns, and such as from about 75 microns to about 125 microns with focal lengths can vary over a very wide range.

In an embodiment where optical fibers are used rather than an MLA, the range of individual fiber diameters could be from several micrometers (i.e., microns) to many hundreds of micrometers to a few millimeters. Of course, the size of the fiber diameter(s) used would limit, in part, the number of spatially isolated Fizeau fringe patterns obtained on the array detector.

Figure 2C:
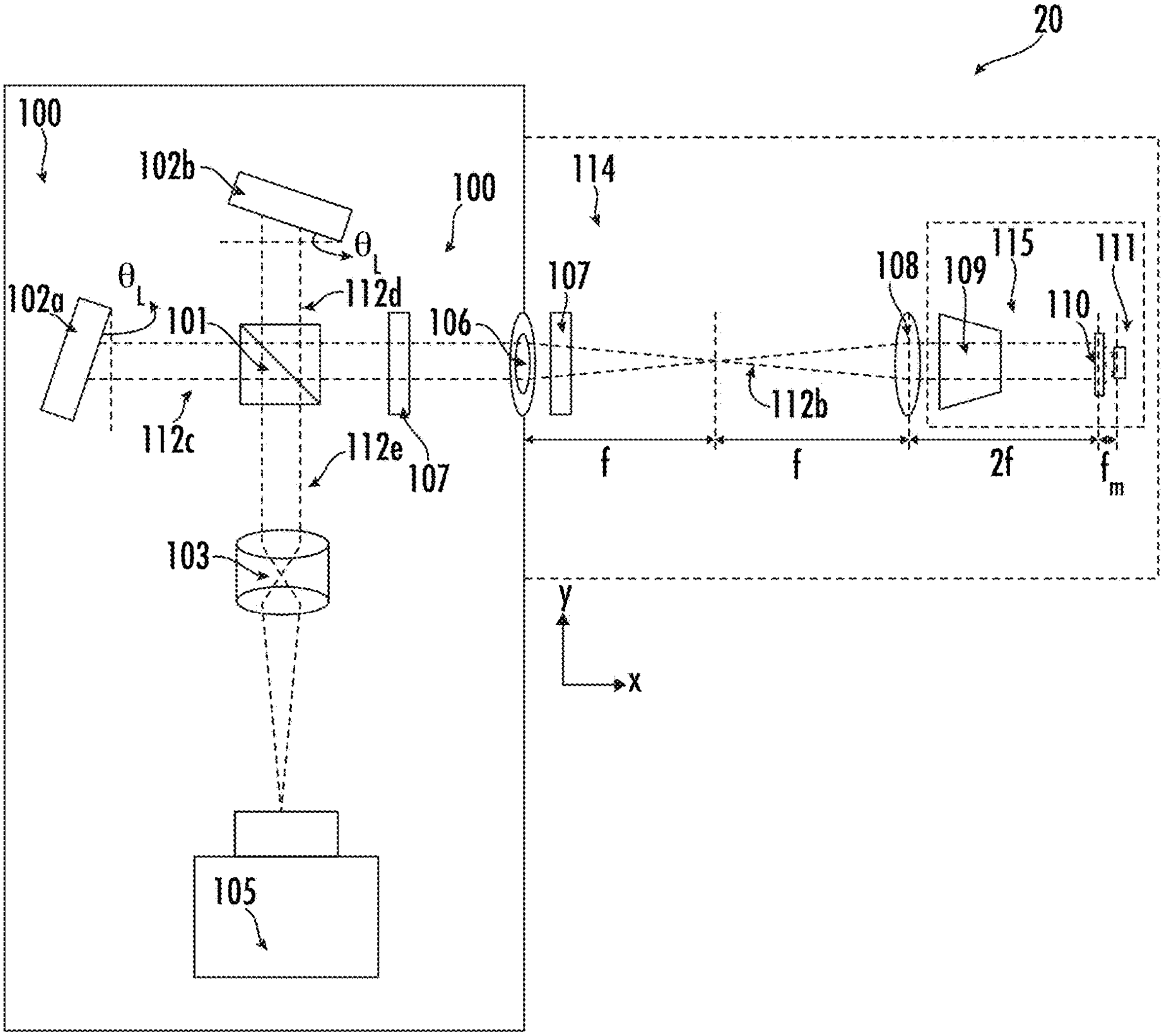
FIG. 2C is an overview of the entire device including the spatial heterodyne spectrometer, the MLA, and the associated relay optics.

FIG. 2C shows a layout of the entire MLA-SHRS setup of system 200. The excitation light travels from the laser (113, see FIG. 2D) along the excitation light path (112*a*) through a dichroic mirror (109) where it is redirected to the MLA (110). The light is focused by the MLA (110) onto the area (111*a*) of the sample (111) at $f_m$ where the signal is reflected back along (112*b*) through the MLA (110) and through the dichroic mirror (109). Light then travels through the transfer lens setup (114) which is composed of a relay lens (108) located two focal lengths from the MLA (110). The light travels through the relay lens (108) which is two focal lengths from the aperture (106) of the SHRS (100). The relay lens (108) focuses the light at a point one focal length from the aperture. Along this light path (112), between the relay lens (108) and the aperture (106), can be one or more filters (107). These filters (107) are often band pass filters or an alternative type of blocking filter and are used to block light from outside the Raman wavelengths. As shown, in FIG. 2C, the filters (107) can be placed in the collimated portion of the beam (i.e., normal incidence) between the beam splitter (101) and the aperture (106), or between the aperture (106) and the relay lens (108) at higher f-numbers. The light then travels through the aperture (106) to the beam splitter (101) where the signal is split (112*c* travels opposite aperture, 112*d* travels opposite the CCD) and is then imaged onto a pair of diffraction gratings (102*a*, 102*b*) at a grating angle in a Littrow configuration ($\theta_L$). The light is then redirected and recombined by the beamsplitter (101), and then travels (along 112*e*) through an additional lens (103) before being imaged by the CCD (105).

Figure 2D:
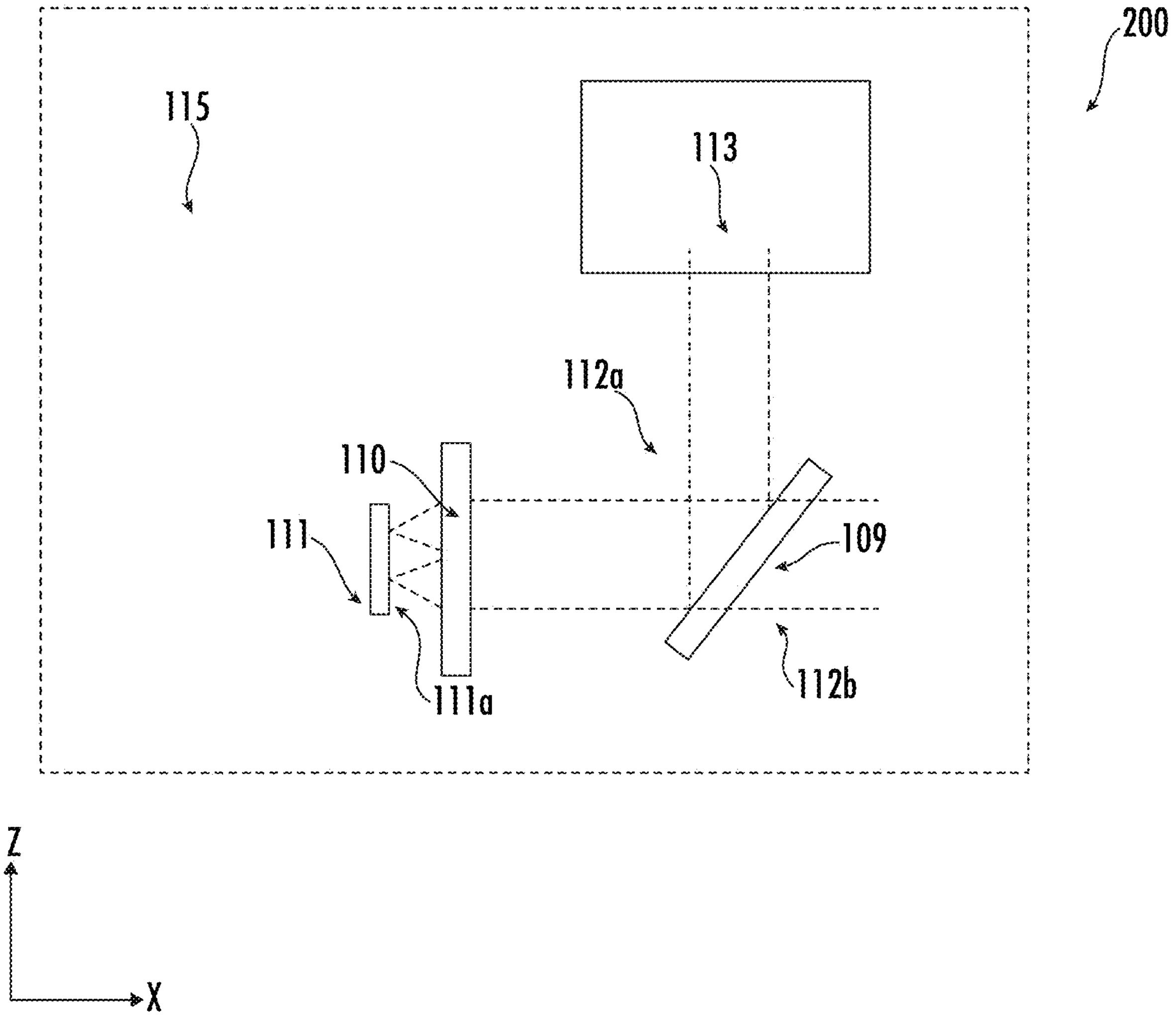
FIG. 2D is a side view of the device showing the laser and MLA setup.

FIG. 2D shows a side view (115) of system 200. Light (112*a*) is generated by the laser (113). The light then travels along the excitation light path (112*a*) to the dichroic mirror (109) where it is redirected to the MLA (110). The light is focused by the MLA (110) onto the area (111*a*) of the sample (111) where the signal is collected back through the MLA (110) and through the dichroic mirror (109). Light then travels through the rest of the transfer lens setup (114) along the path (112*b*) to the SHRS (100).

Figure 3:
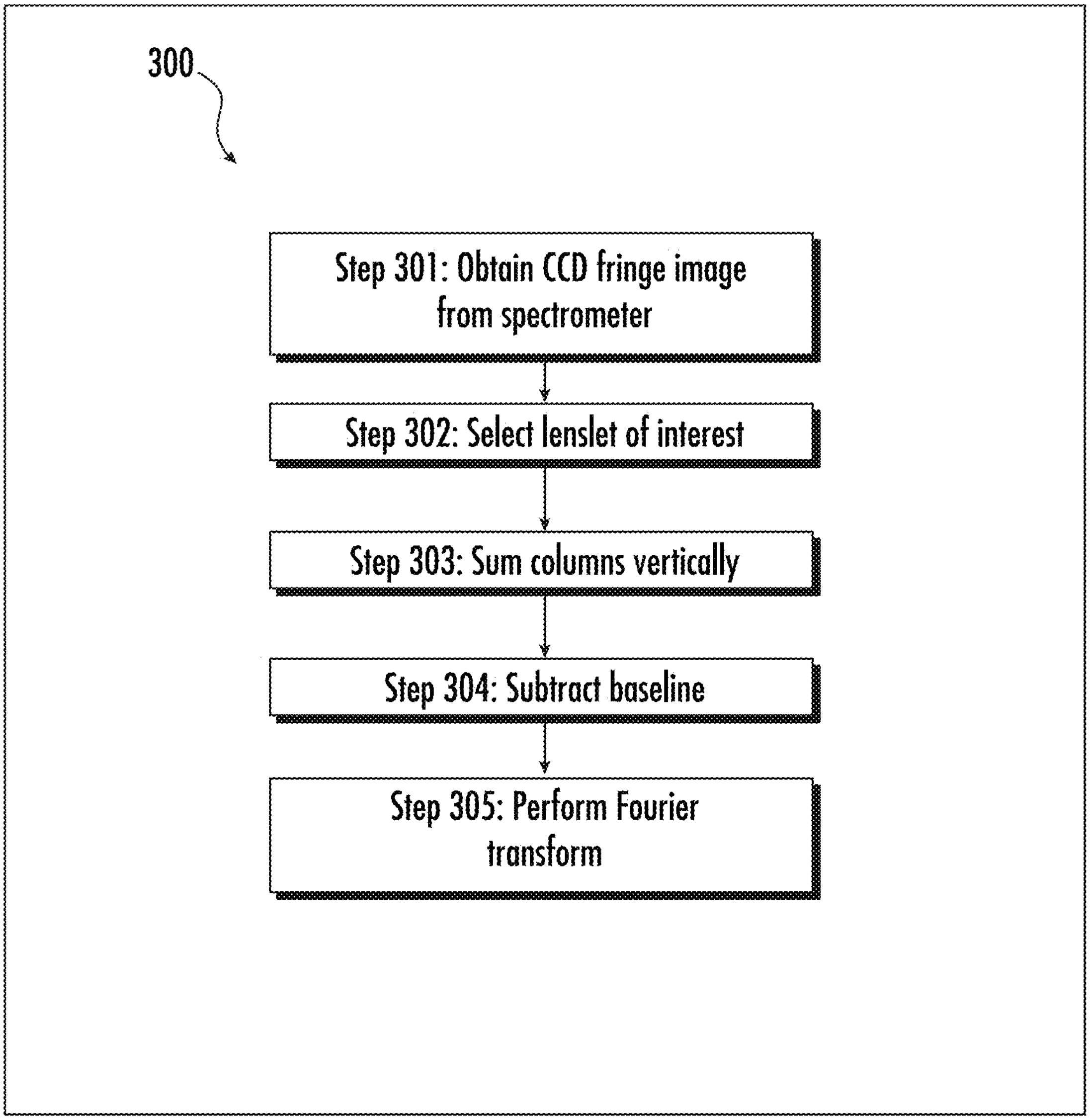
FIG. 3 illustrates the data processing method involved in the presently disclosed subject matter.
Figure 4:
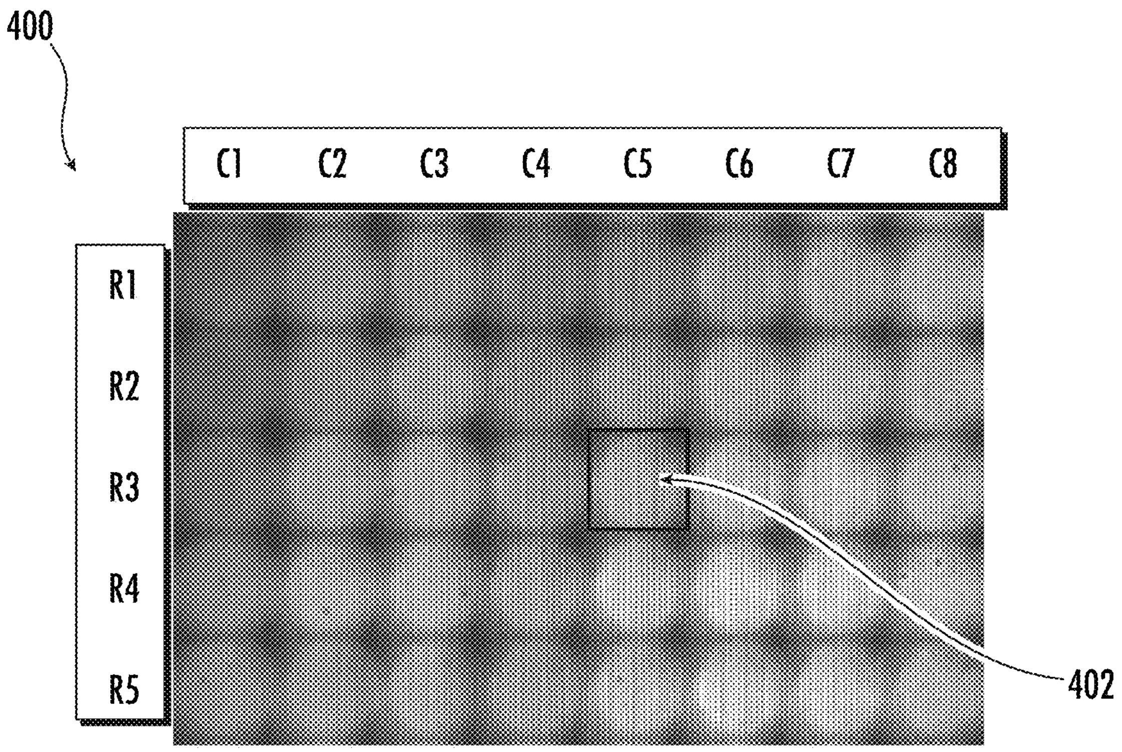
FIG. 4 is a fringe image (i.e., Fizeau fringe pattern) of a diamond sample recorded using the SHRS array detector; the square outline 3 rows down and five columns across indicates a lenslet of interest corresponding to a region of interest, which is shown to be spatially isolated.
Figure 5:
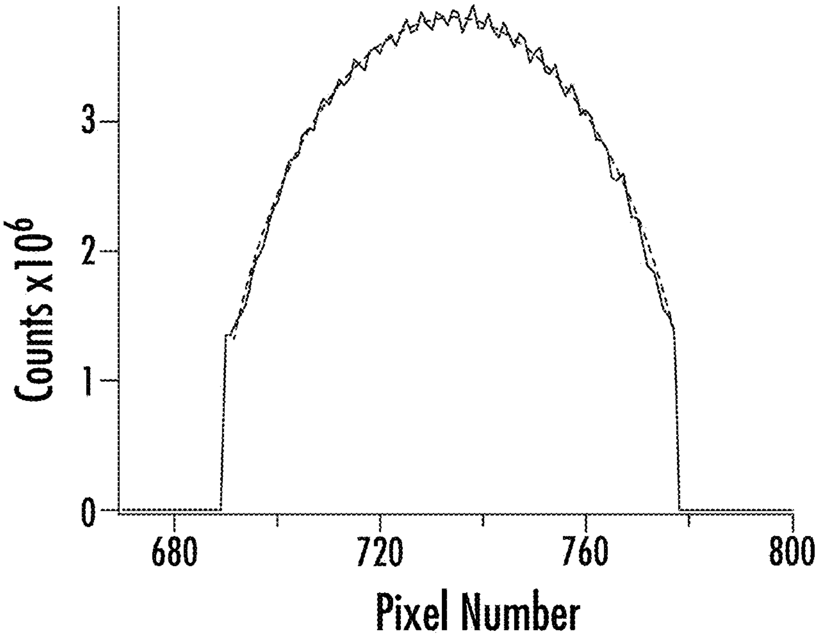
FIG. 5 is a graph of the sum of the columns of the fringe image from the lenslet of interest of FIG. 4; the smoother line is a high order polynomial fit of the data.
Figure 6:
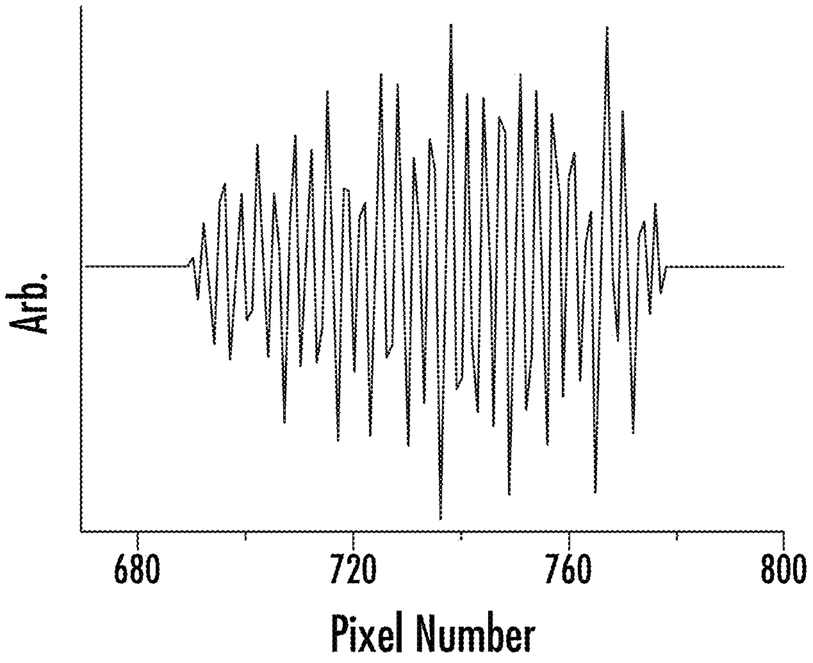
FIG. 6 is a graph of the interferogram cross section result after subtracting the high order polynomial from the data of FIG. 5.
Figure 7:
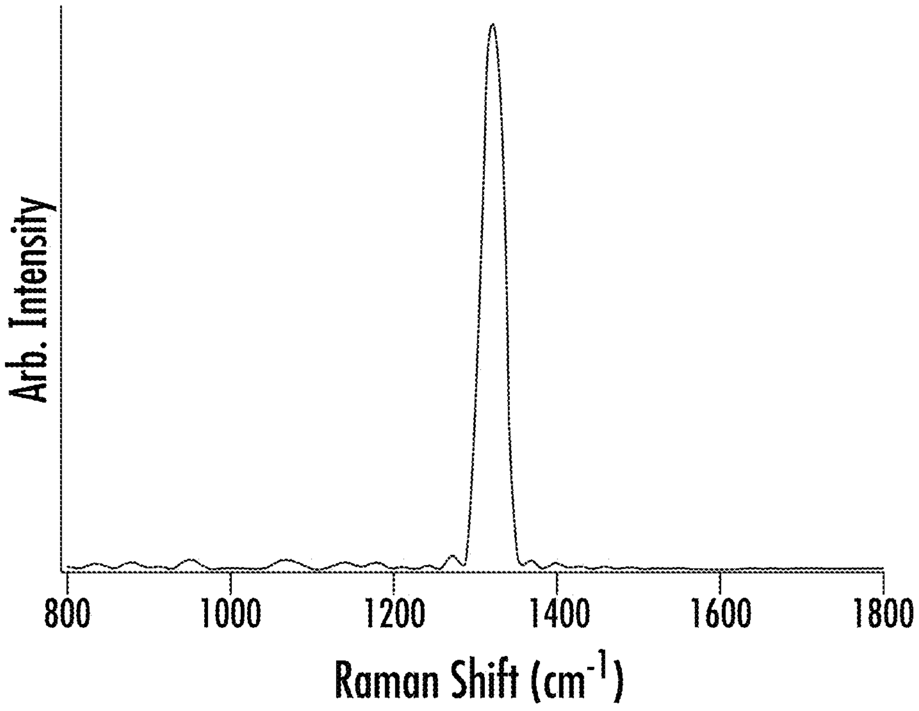
FIG. 7 is a plot of the spectrum extracted after taking a 1D Fourier transform of the interferogram of FIG. 6; this shows the Raman spectrum of the diamond sample.

A method 300 for imaging a sample using the system 200 of the presently disclosed subject matter is described in detail below with reference to FIG. 3. As shown in FIG. 3, method 300 is comprised of five steps. System 200 is used to collect the signal of the light product used by method 300. Once collected by the detector (105) inside the SHRS (100), an array of fringe images is obtained (301). FIG. 4 illustrates one embodiment of a fringe image (400) having rows R1-R5 and columns C1-C8. The square box at row 3, column 5 refers to the lenslet region of interest (402) for a particular sample. The one lenslet region of interest (shown boxed in figures) is chosen (302) and the columns are summed in the vertical direction to provide a raw interferogram superimposed on a background signal (303). The interferogram is obtained by subtracting a polynomial fit from the cross section (304), and the spectrum is obtained by taking the 1D Fourier transform of the interferogram (305). This allows an image and spectrum to be taken at the focal point of every microlens in a single exposure. In some embodiments, the signal may be processed by a variety of different data filters or signal processing software. In one embodiment, a Golay filter can be used when selecting one lenslet spectra.

Figure 13:
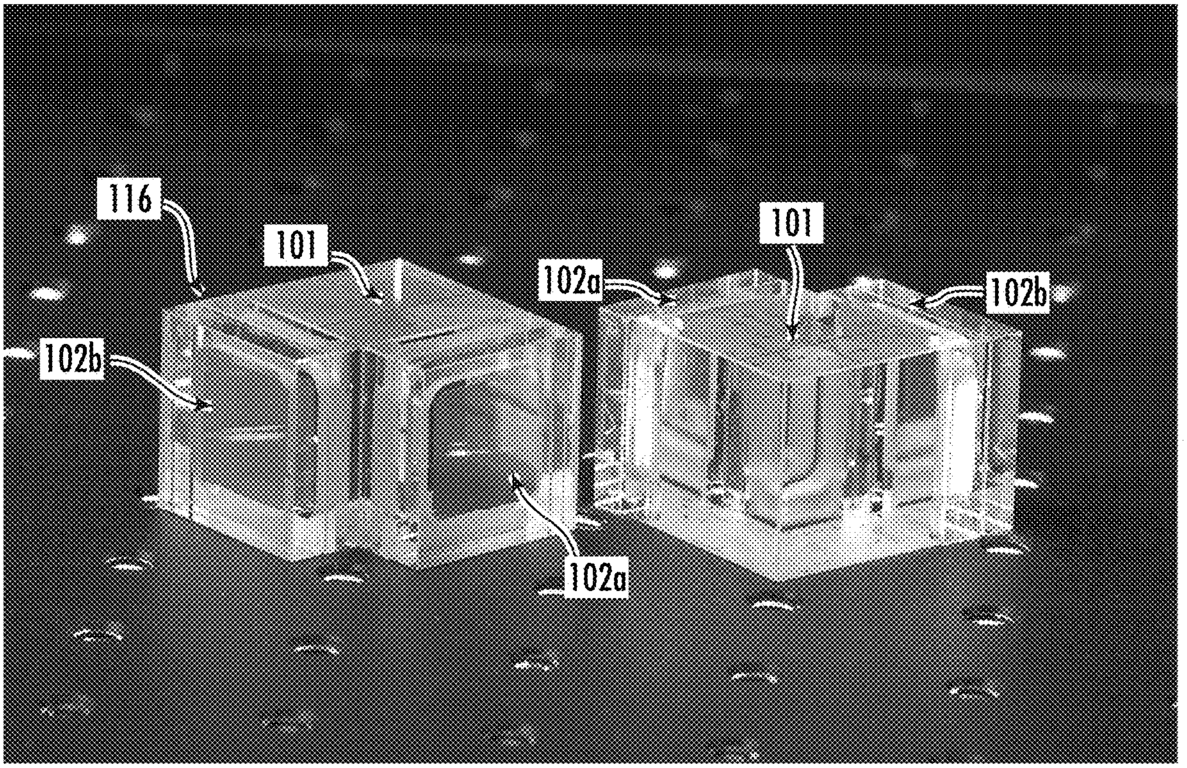
FIG. 13 is a picture of two side-by-side monolithic spatial heterodyne spectrometers (SHSs) designed for use as SHRS and SHLS devices; each SHS device is comprised of the beam splitter, diffraction gratings, grating holders and spacer components that are fused via optical contact or epoxy; both monolith SHSs shown here are constructed of BK7 material.

In an alternative embodiment, the spatial heterodyne spectrometer can be of a monolithic construction, as shown in FIG. 13. Monolithic optics are solid state and are made from bonded components of optical materials (e.g., quartz, fused silica, BK7 or combinations thereof) where the optical components are cemented, epoxied, or optically contacted after alignment. The devices are more robust and stable than equivalent free-space optical devices (e.g., where components are individually mounted). Since the parts are directly bonded together after alignment, the entire system can be very small in size, and since it contains no moving parts, it is much more robust than other spectrometers. It is also less sensitive to vibration, making it ideal for many applications where vibration is a concern. The monolithic spatial heterodyne Raman spectrometer also has very high sensitivity because of a 100-fold higher light throughput for extended sources.

Figure 14:
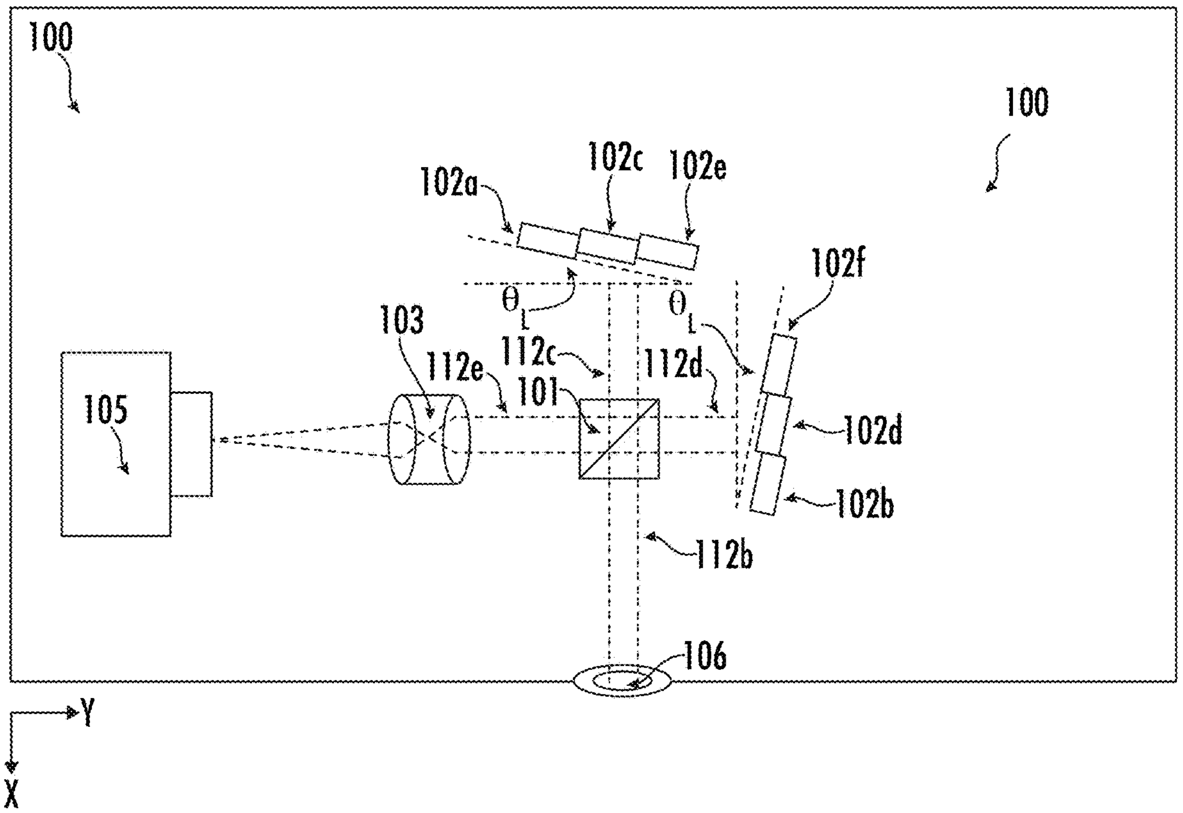
FIG. 14 is a diagram of a spatial heterodyne spectrometer designed with multiple additional diffraction gratings positioned at the same Littrow angle, $\theta_L$; a spacer or spacers can be added to compensate for the different amount of space between the diffraction gratings; one or more pairs of diffraction gratings can be added and adjacently positioned to the original pair.

In yet another embodiment, shown in FIG. 14, the spatial heterodyne spectrometer can contain, in addition to diffraction gratings 102*a* and 102*b*, one or more additional diffraction gratings (102*c*-102*f*) adjacently positioned at the same Littrow wavelength such that the periodic structured surface of each adjacently positioned grating is stepped (i.e., offset a predetermined distance) to adjust for pathlength differences across a portion of or across the entire grating aperture along the dimension parallel or perpendicular to the grating dispersion. The light travels through the aperture (106) of the SHRS (100) to the beamsplitter (101) and then is imaged onto the adjacently positioned diffraction gratings (102*a*-102*f*) at a grating angle in a Littrow configuration ($\theta_L$). The light is then redirected and recombined by the beamsplitter (101), and then travels through an additional lens (103) before being imaged by the CCD (105). The grating angles for Littrow configuration ($\theta_L$), which are measured relative to the surface normal of the diffraction gratings, have a useful range of about 0° to about 45°, such as from about 0.01° to about 30°, such as from about 0.1° to about 15°, such as from about 0° to about 10°, such as from about 0° to about 5°. This is useful in fixed systems where the grating angle cannot be changed, such as a monolithic SHS. Furthermore, each of the adjacently positioned diffraction gratings can be rotated as previously described in a previously discussed embodiment to expand the spectral range. Each of the diffraction gratings could have the same or different groove densities. Each of the diffraction gratings could have a different Littrow wavelength.

Figure 17:
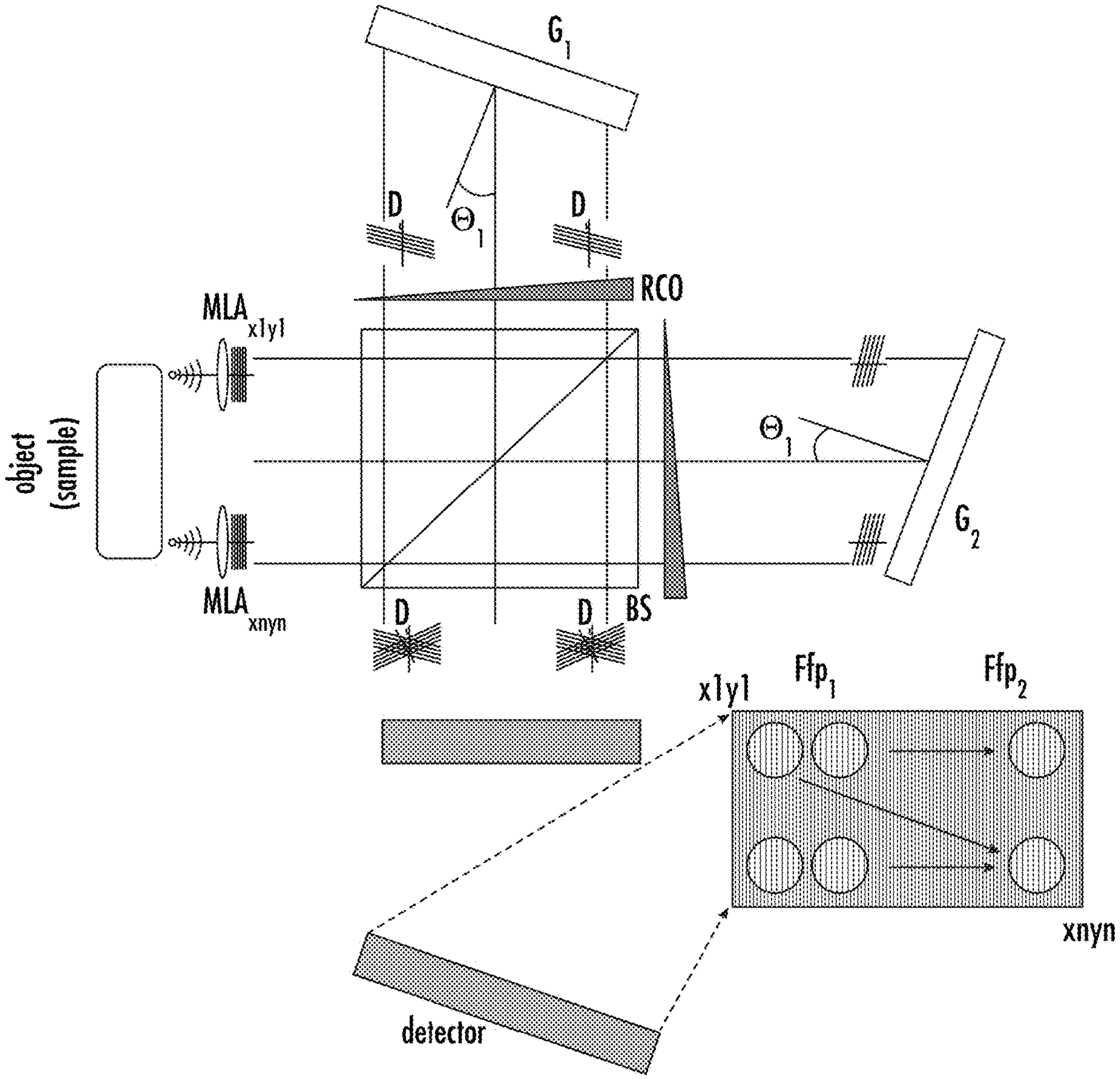
FIG. 17 shows how a refractive corrective optic (RCO) can be used to mitigate SHS pathlength differences across the grating aperture, where the grating aperture refers to the grating area that is useable in the SHS.

In still another embodiment, rather than utilizing stepped diffraction gratings as in FIG. 14, FIG. 17 shows that a refractive optic (i.e., refractive corrective optic-RCO), can be added between the beam splitter and grating (G1 and G2) faces to adjust the pathlength based on refractive index. Note that the grating surface where light dispersion occurs is the surface facing the beam splitter in the illustration. The approach of using an RCO is another concept for adjusting for pathlength differences across a portion or across the entire grating along the dimension parallel or perpendicular to the grating dispersion. This illustration shows the RCO for adjusting pathlength differences along the dimension parallel to the grating dispersion, which would be the preferred implementation for a non-tilted grating SHS design. It should be noted that there are many ways to implement this approach. The design of the RCO would depend, in part, on the initial alignment scheme of the SHS. It should also be noted that the grating aperture refers to the grating area that is useable in the SHS. For example, the monolith SHS devices shown in FIG. 13 have grating apertures of approximately 17×17 $mm^2$.

The presently disclosed subject matter may be better understood by reference to the following examples.

EXAMPLE 1

A continuous 532 nm laser (MLL-FN-532-300 mW, OptoEngine, LLC) illuminated a 25 mm diameter, 550 nm longpass dichroic mirror (DMLP550, ThorLabs, Inc.), which directed the on-axis illumination beam through the MLA (MLA) (19-0055, SÜSS MicroOptics), where each lenslet focused the laser to a spot on the sample. The surface of the sample was located 1.5 mm away at the focal point of the f/16 MLA. In this way, the sample was illuminated in epifluorescent geometry with an array of spots. The Airy disk diameter is 20 microns.

The fused silica MLA had a 4×4 mm overall size with 100-micron diameter circular lenslets packed in a square grid. The MLA had chromium apertures to block light between the lenslets and had an antireflective coating at 780 nm. Samples were illuminated with about 300 μW per lenslet.

Each individual MLA lenslet collected the signal from each illuminated spot. The relay lens, a Nikon™ AF NIKKOR 80-200 mm f/4.5-5.6, was used to image the back surface of the MLA onto the SHRS gratings. The placement and focal setting of the relay lens were changed depending on the desired resolving power per lenslet. For a fixed grating line density, the relay lens magnification dictated the lenslet beam size on the grating face, and therefore, the resolving power per lenslet. Magnifications of 8× and 10× were used. Using 300 lp/mm gratings for 10× magnification, the resolving power per lenslet was 594, which corresponds to about 32 $cm^{-1}$ FWHM, and for 8× magnification, the resolving power per lenslet was 450, which corresponds to about 40 $cm^{-1}$ FWHM. A spatial filter with 4 mm diameter was located at the focal point of the relay lens. This spatial filter isolates the lenslet beams from other background signals as described by Tiziani et. al.

The SHRS was equipped with a 25 mm N-BK7 non polarizing 50:50 cube beamsplitter (BS013, ThorLabs, Inc.) and a pair of 300 lp/mm gratings blazed at 500 nm (#64-403, Edmund Optics). An iris at the input aperture limited the size of the illuminated area on the gratings to 18 mm. The SHRS was equipped with four 532 nm longpass filters (LP03-532RE-25, Semrock RazorEdge®), a 550 nm longpass filter (FEL0550, ThorLabs, Inc.) and a 581 nm shortpass filter (581FDS25, Knight Optical Ltd.) to remove strong Rayleigh scatter from the laser and to keep incoming signal within the SHRS spectral range. Inside the SHS, a fused silica f/4.5 lens with 105 mm focal length (UV-MICRO-APO 111032, Coastal Optical Systems, Inc.) imaged the interferogram with 1.2× magnification onto a thermoelectrically cooled back-illuminated UV-enhanced CCD detector with 2048×512, 13.5 μm pixels (PIXIS-2048 2KBUV, Teledyne Princeton Instruments). A spatial filter placed one focal length from the interferogram imaging lens was used to block higher grating orders. Images were acquired in Lightfield® 4.10 software with 100 kHz ADC gain high and in the low noise setting. The CCD was cooled to −70° C.

To obtain the spectra, the raw image was first imported into MATLAB® and the region of interest was selected. The columns of the selected region were summed in the vertical direction to give a raw interferogram superimposed on a background signal. To remove this background, a polynomial was fit and subtracted from the cross section. This corrected cross-section was then Fourier transformed to reveal the Raman spectrum. A 13 mm pellet die (#3619, Carver) was used to press a variety of heterogeneous pellet samples. All samples were prepared with the intention of keeping the constituents spatially separate. A diamond (Kit #458200, Ward's® Science) was pressed into a Potassium Perchlorate (#11630, 99% anhydrous, Alfa Aesar®) pellet.

Figure 8:
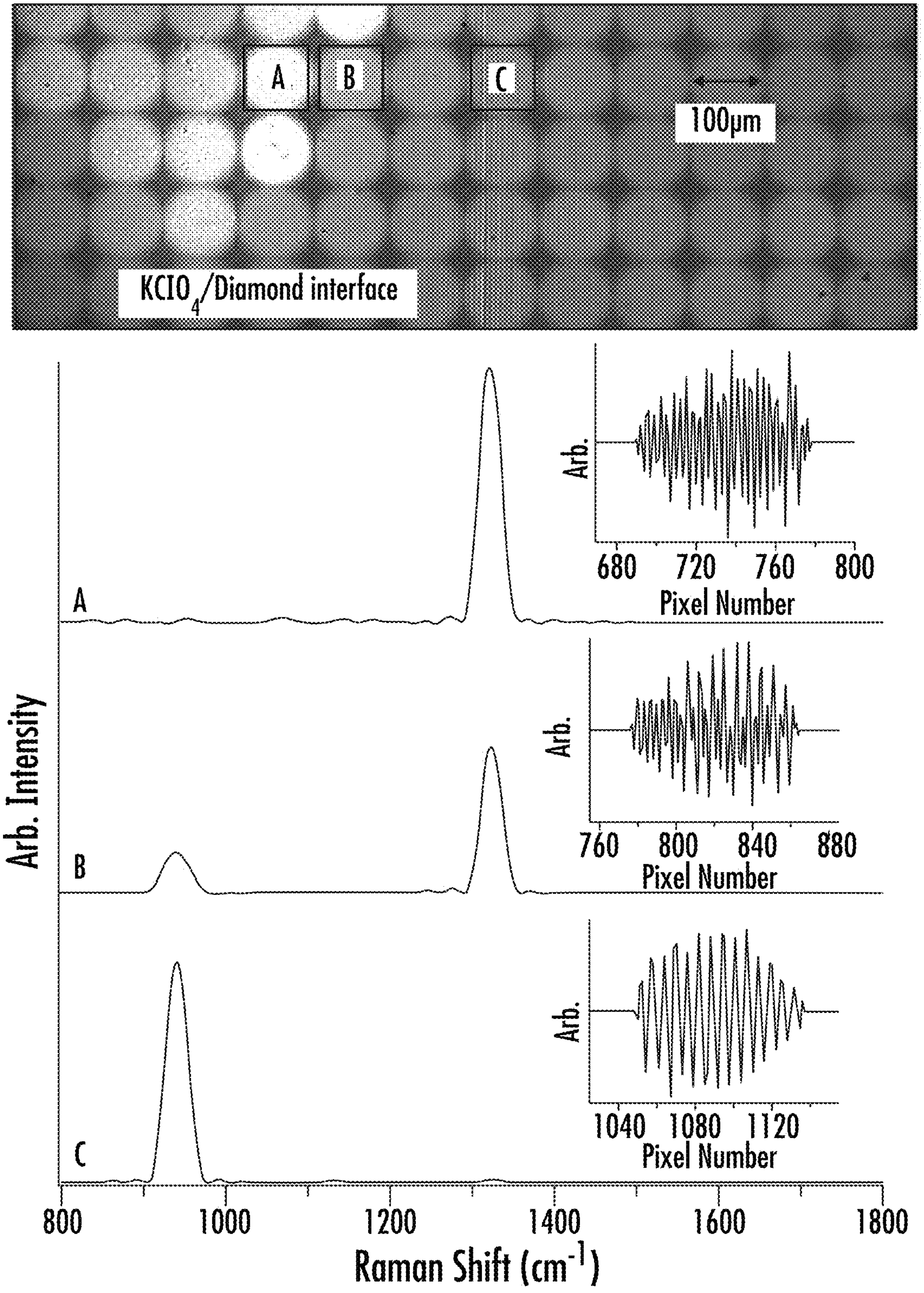
FIG. 8 shows (top) the raw interferogram recorded on the SHRS array detector of a sample of diamond in a potassium perchlorate pellet with the labeled regions of interest A, B, and C with (bottom: inset) the corrected interferogram cross section for each region of interest A, B, and C and the corresponding Raman spectra (bottom) extracted via a Fourier transform method from each corrected interferogram; region of interest A shows a single prominent Raman band for diamond; B shows prominent Raman bands for diamond and potassium perchlorate; and C shows a single prominent Raman band for potassium perchlorate.

FIG. 8 shows diamond in perchlorate measured with the MLA-SHRS. The sample was illuminated with 300 μW/lenslet for 10 minutes. The raw interferogram image at the top is labeled with the one-lenslet regions of interest. Below this are the spectra corresponding to each region of interest, offset for clarity. Region A shows only the diamond Raman band at 1332 $cm^{-1}$; region B shows both potassium perchlorate and diamond Raman bands; and region C shows only the 941 $cm^{-1}$ Raman band of potassium perchlorate. This demonstrates that spatial-spectral separation is retained in the horizontal dimension using the MLA-SHRS. The resolving power per lenslet is 594, which corresponds to about 32 $cm^{-1}$ FWHM. Inlaid with the spectra are the corrected interferograms for each region of interest. Region A is the higher frequency diamond Raman fringes; region B shows a mixture of the diamond and potassium perchlorate Raman fringes; and region C shows the lower frequency potassium perchlorate Raman fringes.

Figure 12:
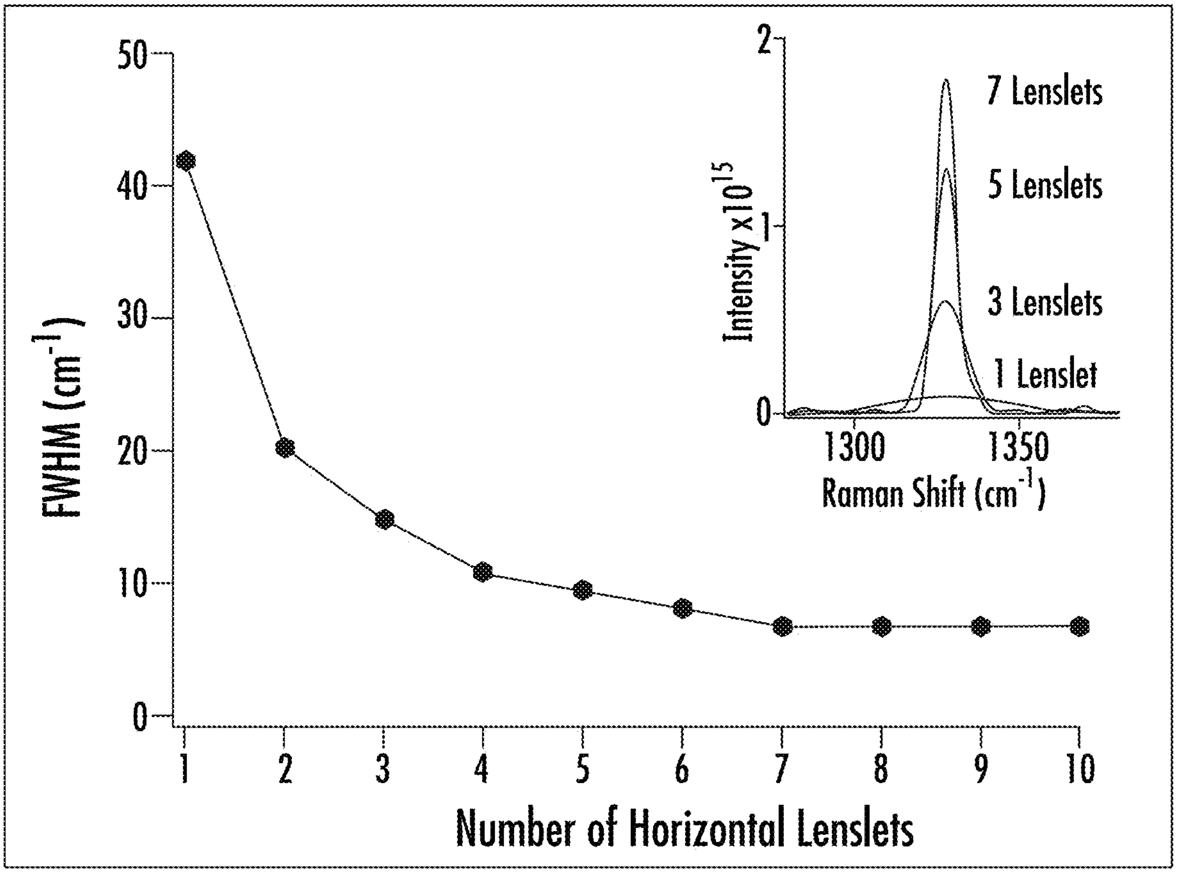
FIG. 12 illustrates the tradeoff between the spectral resolution (i.e., full width half maximum—FWHM—of the Raman spectral feature for diamond) and the area viewed on the diamond sample, of FIG. 8, where increasing the number of horizontal lenslets (e.g., grating grooves illuminated) of the region of interest that undergo a Fourier transform, results in a smaller FWHM value.

FIG. 12 describes the tradeoff between spectral resolution and area viewed on the sample. Resolving power of the SHRS is proportional to the number of grooves illuminated on the gratings. The diamond Raman spectrum was collected using the MLA-SHRS with 300 lp/mm gratings with the MLA magnified 8× onto the SHS gratings. The sample was illuminated with 300 μW/lenslet for 3 minutes. With this system, resolutions from 42 $cm^{-1}$ to 7 $cm^{-1}$ depending on the number of lenslets chosen to Fourier transform could be obtained. The larger the width (more lenslets) of the region of interest that underwent a Fourier transform, the smaller the FWHM in the recovered spectrum. Inlaid in FIG. 12, the diamond Raman peak at 1332 $cm^{-1}$ plotted for 1, 3, 5 and 7 lenslet regions of interest. One lenslet corresponds to 100-micron diameter area viewed on the sample.

EXAMPLE 2

Figure 9:
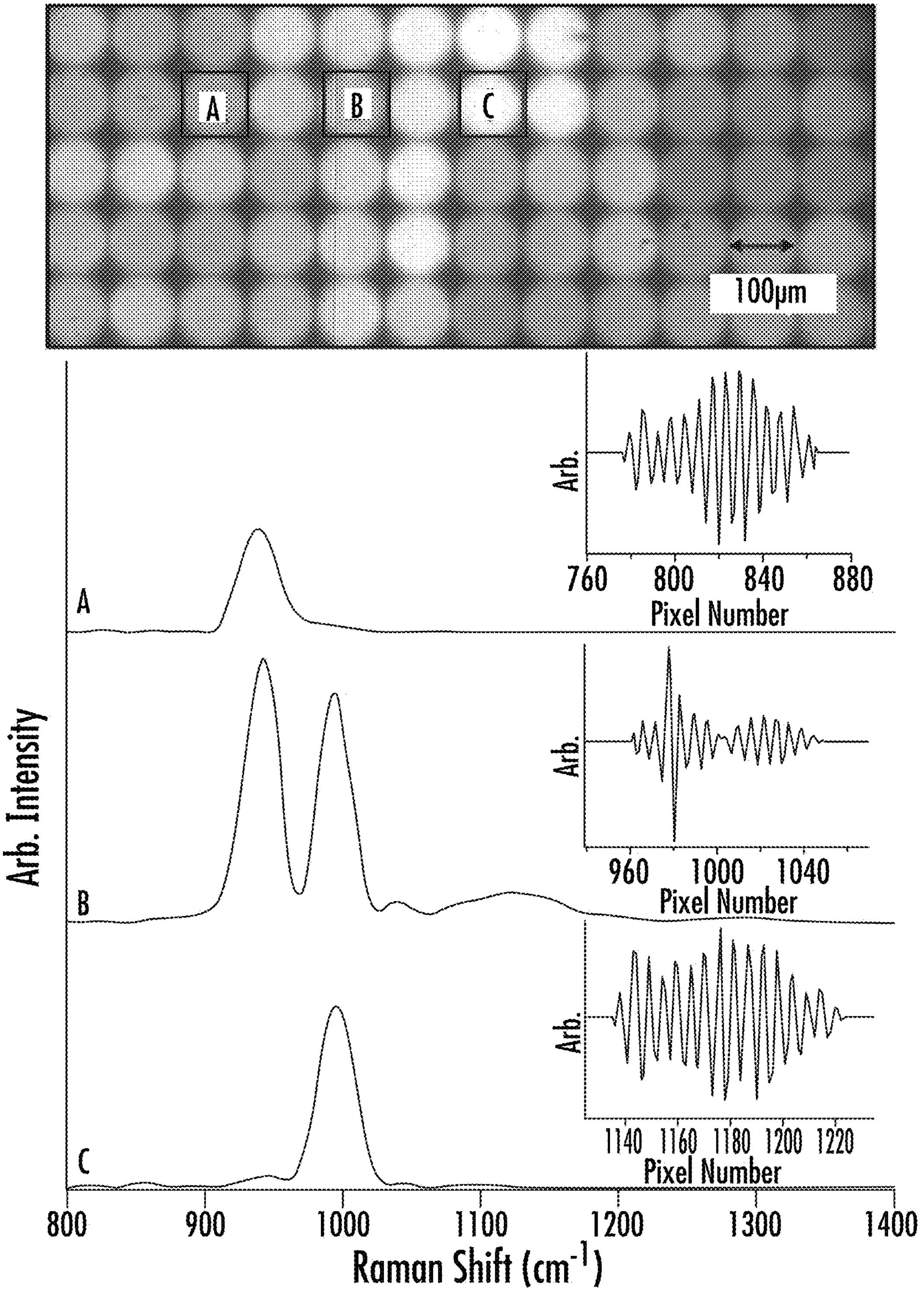
FIG. 9 shows (top) the raw interferogram recorded on the SHRS array detector of a sample of sodium sulfate and potassium perchlorate bilayer pellet with the labeled regions of interest A, B, and C with (bottom: inset) the corrected interferogram cross-section for each region of interest A, B, and C and the corresponding Raman spectra (bottom) extracted via a Fourier transform method from each corrected interferogram; region of interest A shows a single prominent Raman band for potassium perchlorate; B shows prominent Raman bands for potassium perchlorate and sodium sulfate; and C shows a single prominent Raman band for sodium sulfate.

Further using the operational setup shown in Example 1, a bilayer pellet of sodium sulfate and potassium perchlorate (239313, Sigma Aldrich) was sampled. FIG. 9 shows a sodium sulfate/potassium chlorate bilayer pellet measured with the MLA-SHRS. The sample was illuminated with 300 μW/lenslet for 10 minutes. The raw interferogram image is labeled with the one-lenslet regions of interest and the corresponding spectra are shown below. Spatial-spectral separation is demonstrated again as region A shows only the sodium sulfate band at 990 $cm^{-1}$; region B shows both potassium perchlorate and sodium sulfate Raman bands; and region C shows only the 941 $cm^{-1}$ Raman band of potassium perchlorate. The resolving power per lenslet was 594 (which corresponds to about 32 $cm^{-1}$ FWHM), which was enough to resolve the closely spaced bands. The corrected interferograms for each region of interest are inlaid with the spectra. Region A is the higher frequency sodium sulfate Raman fringes; region B shows a mixture of the sodium sulfate and potassium perchlorate Raman fringes; and region C shows the lower frequency potassium perchlorate Raman fringes.

EXAMPLE 3

Figure 10:
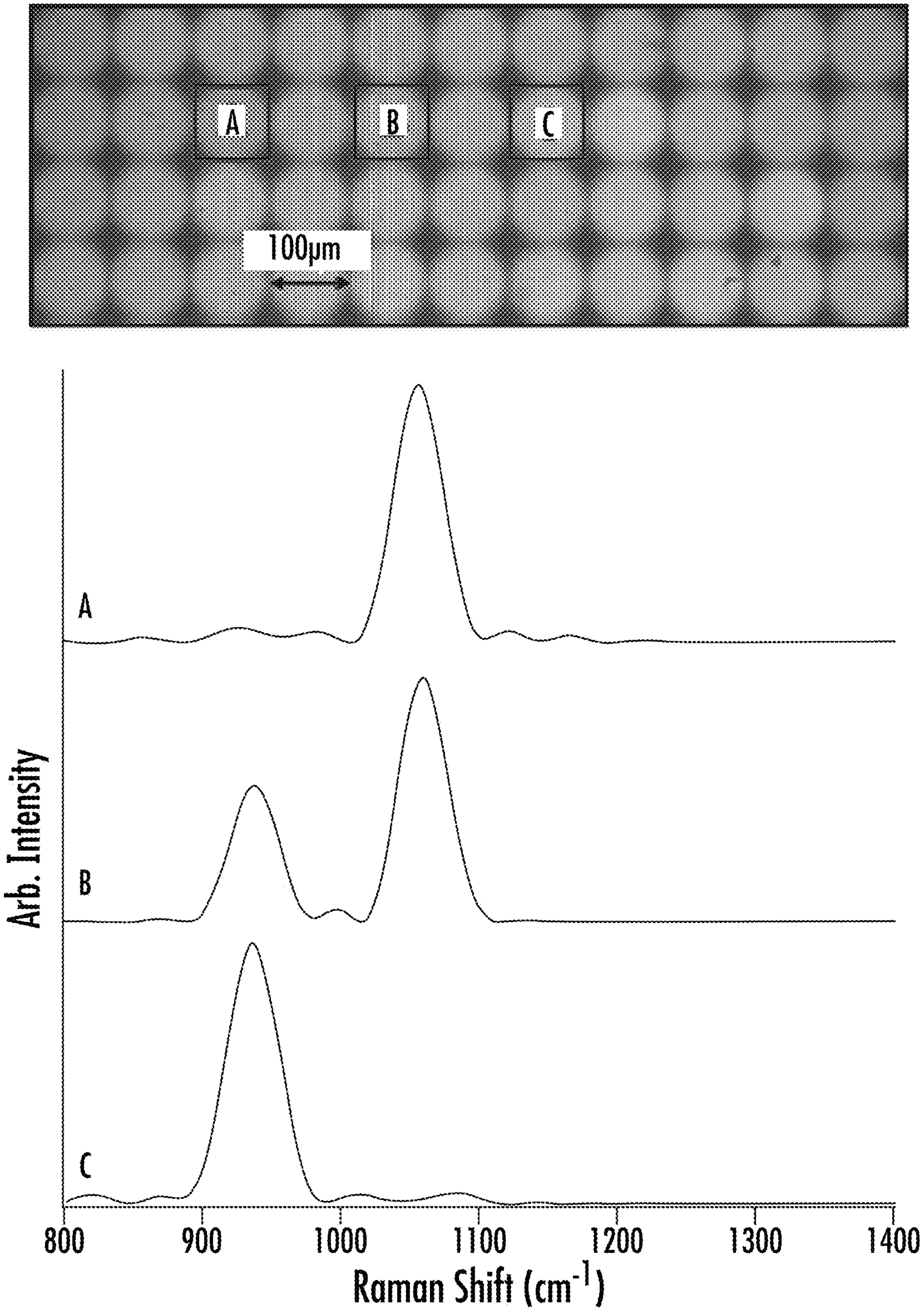
FIG. 10 shows (top) the raw interferogram recorded on the SHRS array detector of a sample of sodium nitrate and potassium perchlorate bilayer pellet with the labeled regions of interest A, B, and C and the corresponding Raman spectra (bottom) extracted via a Fourier transform method from each corrected interferogram (not shown); region of interest A shows a single prominent Raman band for sodium nitrate; B shows prominent Raman bands for potassium perchlorate and sodium nitrate; and C shows a single prominent Raman band for potassium perchlorate.

Further, using the operational setup shown in Example 1, a bilayer pellet of sodium nitrate and potassium perchlorate (347663, Sigma Aldrich) was sampled. FIG. 10 shows a sodium nitrate/potassium perchlorate bilayer pellet measured with the MLA-SHRS. The sample was illuminated with 300 μW/lenslet for 3 minutes. The raw interferogram image was labeled with the one-lenslet regions of interest and the corresponding spectra are below. Region A shows only the sodium nitrate band at 1068 $cm^{-1}$; region B shows both potassium perchlorate and sodium nitrate Raman bands; and region C shows only the 941 $cm^{-1}$ Raman band of potassium perchlorate. The resolving power per lenslet was 450, which corresponds to about 40 $cm^{-1}$ FWHM.

EXAMPLE 4

Figure 11:
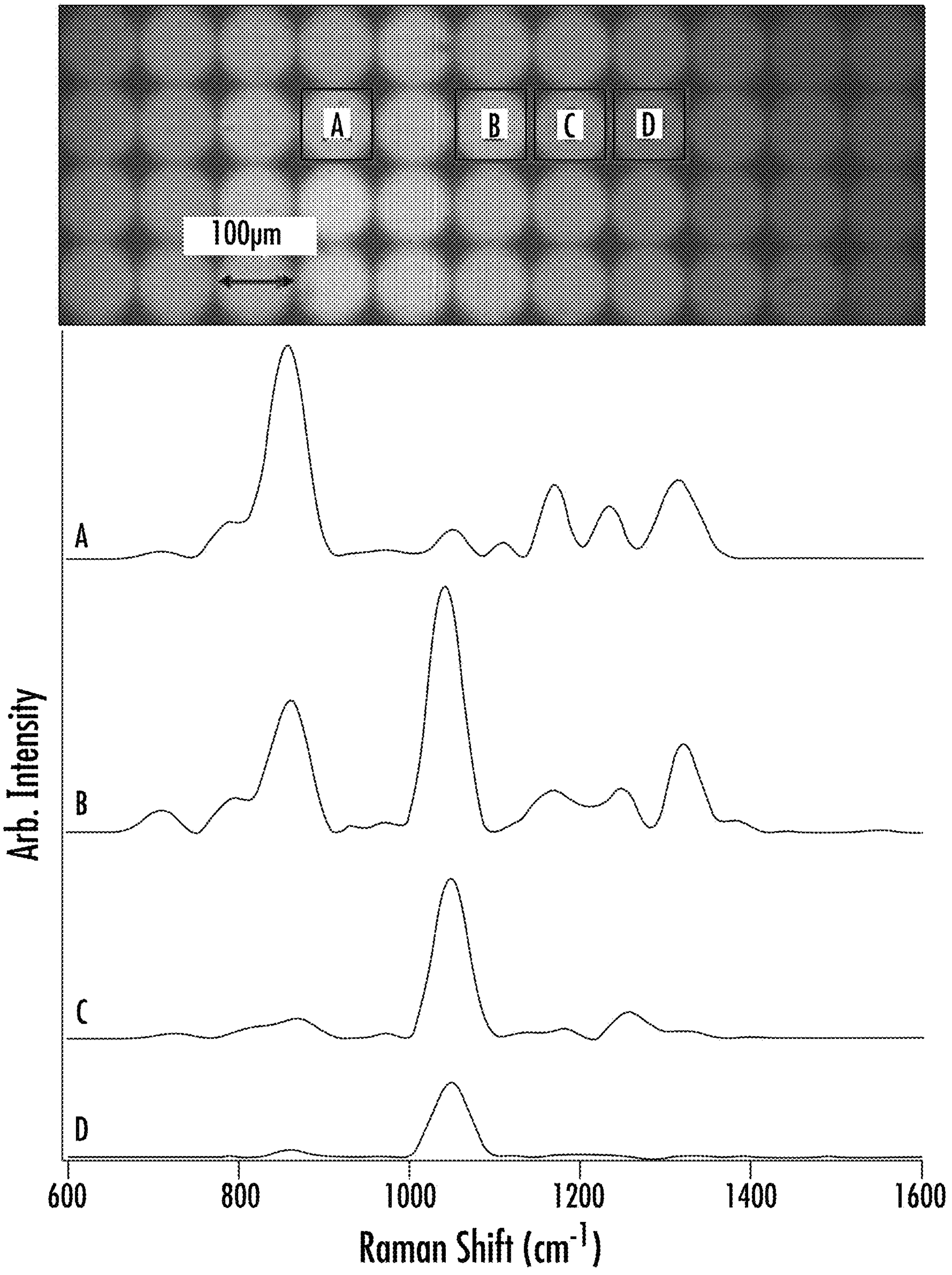
FIG. 11 shows (top) the raw interferogram recorded on the SHRS array detector of a sample of acetaminophen and ammonium nitrate bilayer pellet with the labeled regions of interest A, B, C, and D and the corresponding Raman spectra (bottom) extracted via a Fourier transform method from each corrected interferogram (not shown); region of interest A shows prominent Raman bands for acetaminophen; B and C show prominent Raman bands for acetaminophen and ammonium nitrate at different relative concentrations; and D shows a prominent Raman band for ammonium nitrate.

Further, using the operational setup shown in Example 1, a bilayer pellet of acetaminophen and ammonium nitrate (A7085 and 256064, Sigma Aldrich) was sampled. FIG. 11 shows an acetaminophen/ammonium nitrate bilayer pellet measured with the MLA-SHRS. The sample was illuminated with 300 μW/lenslet for 3 minutes. The raw interferogram image is labeled with the one-lenslet regions of interest and the corresponding spectra are below. The changing concentrations of acetaminophen and ammonium nitrate are seen across each lenslet of interest. Region A shows the acetaminophen Raman spectrum; regions B and C show the Raman bands of both acetaminophen and ammonium nitrate at different concentrations; and region D shows only the ammonium nitrate peak at 1043 $cm^{-1}$. The resolving power per lenslet was 450, which corresponds to about 40 $cm^{-1}$ FWHM.

Although the presently disclosed subject matter has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent, or patent application was specifically and individually indicated to be incorporated herein by reference. In addition, citation or identification of any reference in this application shall not be construed as an admission that such reference is available as prior art to the presently disclosed subject matter.

EXAMPLE 5

Figure 16:
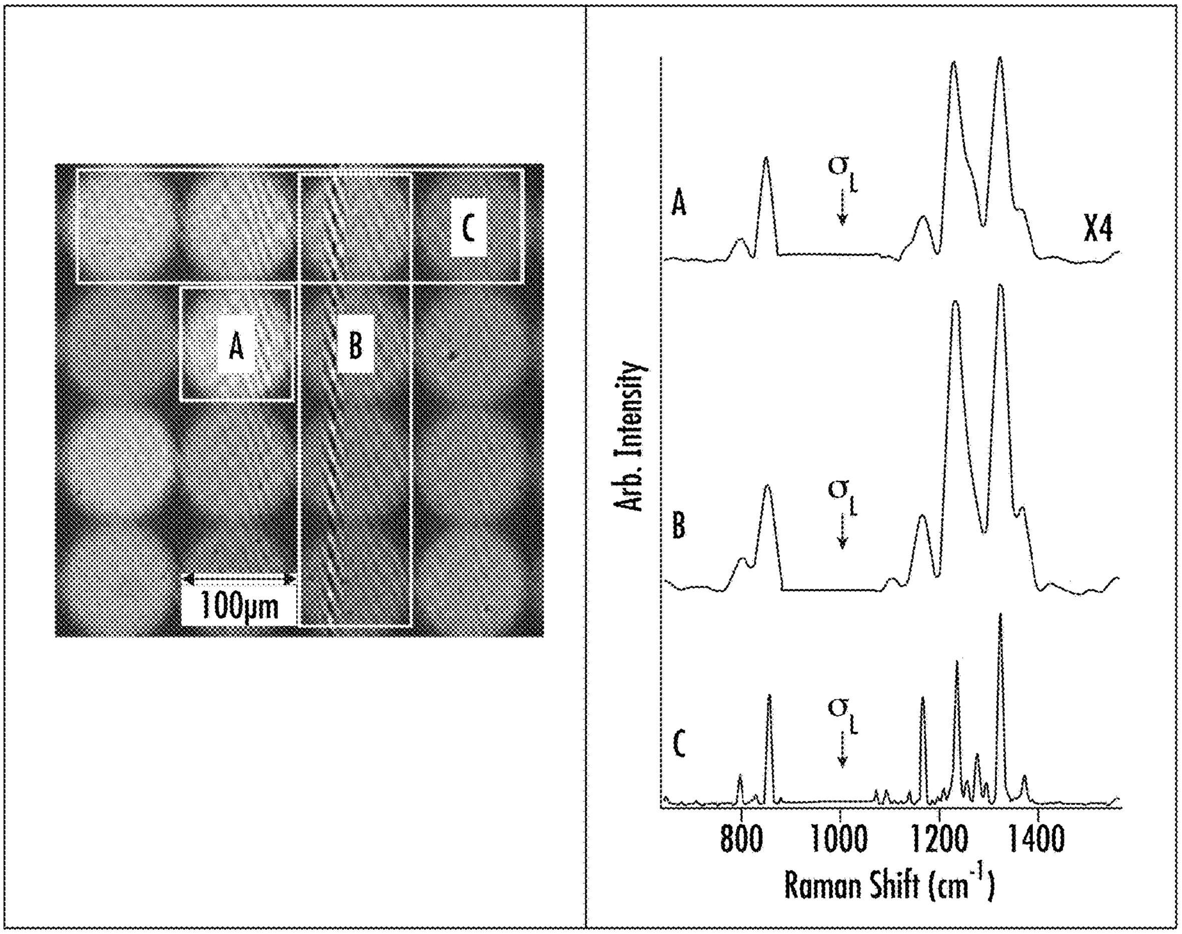
FIG. 16 shows a 4×4 section of lenslets having spatially isolated interferograms with a cross-hatched pattern, which is indicative of a rotation of the Fizeau fringes and a phase shift along the y-axis.

For Raman imaging measurements of an acetaminophen sample, FIG. 16 shows a 4×4 section of lenslets having spatially isolated interferograms with a cross-hatched pattern, which is indicative of a rotation of the Fizeau fringes and a phase shift along the y-axis. The Littrow wavenumber of the SHRS was set to ~1000 $cm^{-1}$ as indicated by $\theta_L$ in the spectra, so Raman bands above and below Littrow rotate the fringes in opposite directions. Raman spectra (right) for the regions A-C, labeled on the detector fringe image, were obtained via a 2D Fourier transform method. Using the MLA-SHRS for Raman imaging, there is a tradeoff between spectral resolution and number of lenslets used in the horizontal direction (e.g., grating grooves illuminated). For example, the spectra produced by region A for a single lenslet, and region B which covers four lenslets vertically, produce spectra with the same resolution, ~42 $cm^{-1}$, because both regions illuminate the same number of grating grooves. However, the spectrum produced by region C, viewing 4 lenslets horizontally, has four times higher resolution, ~11 $cm^{-1}$, because 4 times as many grating grooves were illuminated. The intensity scales with the number of lenslets viewed, regardless of the direction.

What is claimed:

1. A device for imaging a sample comprising:
an excitation source;
a spatial heterodyne spectrometer comprising a pair of diffraction gratings and an array detector; and
a microlens array; wherein the microlens array and a surface of the sample to be imaged are arranged in parallel, and wherein the microlens array collects light from different regions of the surface of the sample; and
a relay lens that images a back surface of the microlens array onto the pair of diffraction gratings such that light beams from individual lenslets of the microlens array remain separate in space, wherein the spatial heterodyne spectrometer generates a spatially isolated Fizeau fringe pattern for each of the individual lenslets on the array detector.

2. The device of claim 1, wherein the excitation source is a light emitting diode, a laser source, a coherent source, an incoherent source, or a combination thereof.

3. The device of claim 1, wherein the spatial heterodyne spectrometer is a laser-induced breakdown spectrometer.

4. The device of claim 1, wherein the spatial heterodyne spectrometer is configured to receive Raman wavelengths from the sample.

5. The device of claim 4, further comprising one or more band pass filters, the one or more band pass filters being configured to remove light outside of the Raman wavelengths.

6. The device of claim 1, further comprising one or more blocking filters.

7. The device of claim 1, wherein the array detector is a charge coupled device configured to collect Raman wavelengths.

8. The device of claim 1, wherein the pair of diffraction gratings are configured to adjust Raman wavelengths.

9. The device of claim 8, wherein a grating angle of the pair of diffraction gratings is adjustable.

10. The device of claim 8, wherein the spatial heterodyne spectrometer contains one or more simple wedge prisms to adjust an acceptance angle of light from the sample.

11. The device of claim 10, further comprising transfer optics comprised of one or more collection lenses or apertures for collimating the light from the microlens array to within the acceptance angle of the spatial heterodyne Raman spectrometer.

12. The device of claim 11, wherein the relay lens is positioned two focal lengths from the microlens array and two focal lengths from an aperture of the spatial heterodyne Raman spectrometer.

13. The device of claim 12, wherein a center of the microlens array is aligned with a center of the relay lens.

14. The device of claim 1, wherein the microlens array magnifies an image of the sample.

15. A device comprising:

an excitation source;

a spatial heterodyne spectrometer comprised of a beam splitter, a pair of diffraction gratings, and an array detector;

one or more additional diffraction gratings;

a microlens array, wherein the microlens array and a surface of a sample to be imaged are arranged in parallel, and wherein the microlens array collects light from different regions of the surface of the sample; and a relay lens that images a back surface of the microlens array onto the pair of diffraction gratings and the one or more additional diffraction gratings such that light beams from individual lenslets of the microlens array remain separate in space, wherein the spatial heterodyne spectrometer generates a spatially isolated Fizeau fringe pattern for each of the individual lenslets on the array detector.

16. The device of claim 15, wherein the excitation source is a light emitting diode, a laser source, a coherent source, an incoherent source, or a combination thereof.

17. The device of claim 15, wherein the spatial heterodyne spectrometer is a monolithic spatial heterodyne spectrometer.

18. The device of claim 15, wherein the additional diffraction gratings are stacked sequentially one above another, further wherein spacers are disposed between each of the additional diffraction gratings.

19. The device of claim 18, wherein a different Littrow wavelength for each of the additional diffraction gratings is selected by adjusting a grating angle of each of the additional diffraction gratings individually relative to each other and relative to the grating angle of the pair of diffraction gratings in the spatial heterodyne spectrometer.

20. The device of claim 18, wherein each of the additional diffraction gratings has a unique groove density relative to each other and relative to the groove density of the pair of diffraction gratings in the spatial heterodyne spectrometer.

* * * * *